United States Patent
Itsuji et al.

(10) Patent No.: US 11,770,596 B2
(45) Date of Patent: Sep. 26, 2023

(54) TERAHERTZ WAVE CAMERA AND DETECTION MODULE

(71) Applicant: CANON KABUSHIKI KAISHA, Tokyo (JP)

(72) Inventors: Takeaki Itsuji, Hiratsuka (JP); Noriyuki Kaifu, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 16/893,814

(22) Filed: Jun. 5, 2020

(65) Prior Publication Data

US 2020/0304695 A1  Sep. 24, 2020

Related U.S. Application Data

(63) Continuation of application No. PCT/JP2018/044828, filed on Dec. 6, 2018.

(30) Foreign Application Priority Data

Dec. 13, 2017  (JP) .................................. 2017-239114
Oct. 12, 2018   (JP) .................................. 2018-193166

(51) Int. Cl.
  *G01N 21/3581* (2014.01)
  *H04N 23/52* (2023.01)
  *H04N 23/51* (2023.01)
  *H04N 23/54* (2023.01)

(52) U.S. Cl.
  CPC ......... *H04N 23/52* (2023.01); *G01N 21/3581* (2013.01); *H04N 23/51* (2023.01); *H04N 23/54* (2023.01); *G01N 2201/064* (2013.01)

(58) Field of Classification Search
  CPC ............. H04N 5/22521; H04N 5/2252; H04N 5/2253; G01N 21/3581; G01N 2201/064
  See application file for complete search history.

(56) References Cited

U.S. PATENT DOCUMENTS

| | | |
|---|---|---|
| 7,551,269 B2 | 6/2009 | Itsuji |
| 7,560,695 B2 | 7/2009 | Kasai |
| 7,692,147 B2 | 4/2010 | Hu et al. |

(Continued)

FOREIGN PATENT DOCUMENTS

| | | |
|---|---|---|
| CN | 101059454 A | 10/2007 |
| CN | 101377406 A | 3/2009 |

(Continued)

OTHER PUBLICATIONS

Feb. 26, 2019 International Search Report in International Patent Appln. No. PCT/JP2018/044828.

(Continued)

*Primary Examiner* — David P Porta
*Assistant Examiner* — Fani Polyzos Boosalis
(74) *Attorney, Agent, or Firm* — Venable LLP

(57) ABSTRACT

A terahertz wave camera that acquires information on a measurement target includes: a sensor unit in which a plurality of elements having spectral sensitivity to the terahertz wave are arranged; a readout circuit unit that reads out signals from the elements; a first light-shielding portion; and an optical unit. The first light-shielding portion reduces disturbance light to which the readout circuit unit has spectral sensitivity. The optical unit guides a terahertz wave from the measurement target to the sensor unit.

38 Claims, 11 Drawing Sheets

(56) References Cited

U.S. PATENT DOCUMENTS

| | | | |
|---|---|---|---|
| 7,709,797 | B2 | 5/2010 | Sekiguchi et al. |
| 7,745,791 | B2 | 6/2010 | Kasai |
| 7,852,466 | B2 | 12/2010 | Itsuji |
| 8,072,526 | B2 | 12/2011 | Tashiro et al. |
| 9,638,578 | B2 | 5/2017 | Tomioka |
| 9,909,986 | B2 * | 3/2018 | Rahman ............ G01N 21/3581 |
| 9,961,280 | B2 | 5/2018 | Sekiguchi et al. |
| 10,018,557 | B2 | 7/2018 | Shiramizu et al. |
| 2007/0215808 | A1 | 9/2007 | Sekiguchi et al. |
| 2007/0235718 | A1 | 10/2007 | Kasai |
| 2008/0156991 | A1 | 7/2008 | Hu et al. |
| 2009/0059205 | A1 | 3/2009 | Itsuji |
| 2009/0231571 | A1 | 9/2009 | Itsuji |
| 2009/0236529 | A1 | 9/2009 | Kasai |
| 2011/0315880 | A1 | 12/2011 | Nemirovsky |
| 2014/0231648 | A1 | 8/2014 | Kotter |
| 2015/0131783 | A1 | 5/2015 | Sato |
| 2015/0276489 | A1 | 10/2015 | Cumming |
| 2015/0365611 | A1 | 12/2015 | Sekiguchi et al. |
| 2016/0084702 | A1 | 3/2016 | Tomioka |
| 2016/0131889 | A1 | 5/2016 | Morimoto et al. |
| 2017/0062643 | A1 | 3/2017 | Segura-Puchades |
| 2018/0080868 | A1 | 3/2018 | Shiramizu et al. |

FOREIGN PATENT DOCUMENTS

| | | |
|---|---|---|
| CN | 104570339 A | 4/2015 |
| CN | 104622489 A | 5/2015 |
| CN | 105445186 A | 3/2016 |
| CN | 105762164 A | 7/2016 |
| JP | 2007-248382 A | 9/2007 |
| JP | 2008-122278 A | 5/2008 |
| JP | 2013-253896 A | 12/2013 |
| JP | 2014-175819 A | 9/2014 |
| WO | 2013/082622 A2 | 6/2013 |
| WO | 2015/001753 A1 | 1/2015 |
| WO | 2016/147253 A1 | 9/2016 |

OTHER PUBLICATIONS

Dec. 6, 2021 Chinese Official Action in Chinese Patent Appln. No. 201880079429.0.

Andreas Bergner, et al., "New p-Ge THz laser spectrometer for the study of solutions: THz absorption spectroscopy of water", Review of Scientific Instruments, AIP, Melville, NY, US, vol. 76, No. 6, May 2005, p. 063110, XP012079463.

Jul. 20, 2021 European Search Report in European Patent Appln. No. 18889492.7.

Jun. 16, 2020 International Preliminary Report on Patentability in International Patent Appln. No. PCT/JP2018/044828.

Jun. 27, 2022 Office Action in Chinese Patent Appln. No. 201880079429.0 (with English translation).

JP 2014-175819 A, US 2015/0365611 A1, JP 2014-175819 A and US 2015/0365611 A1 were cited in Jun. 5, 2020 IDS.

WO 2015/001753 A1, US 2016/0131889 A1, WO 2015/001753 A1 and US 2016/0131889 A1 were cited in Jun. 5, 2020 IDS.

Nov. 29, 2022 Japanese Official Action in Japanese Patent Appln. No. 2018-193166.

Jan. 31, 2023 Chinese Official Action in Chinese Patent Appln. No. 201880079429.0.

US 2008/0156991 A cited in Jul. 27, 2022 IDS.

US 2016/0131889 A1 cited in Jun. 5, 2020 IDS.

Jun. 21, 2023 Chinese Official Action in Chinese Patent Appln. No. 201880079429.0.

CN 101059454 A, US 2007/0235718 A1, US 2009/0236529 A1, U.S. Pat. No. 7,560,695 B2, U.S. Pat. No. 7,745,791 B2.

CN 101377406 A, US 2009/0059205 A1, US 2009/0231571 A1, U.S. Pat. No. 7,551,269 B2, U.S. Pat. No. 7,852,466 B2.

JP 2008-122278 A.

US 2016/0276489 A1.

CN 104570339 A.

* cited by examiner

TERAHERTZ WAVE CAMERA AND DETECTION MODULE

CROSS-REFERENCE TO RELATED APPLICATIONS

This application is a Continuation of International Patent Application No. PCT/JP2018/044828, filed Dec. 6, 2018, which claims the benefit of Japanese Patent Application No. 2017-239114, filed Dec. 13, 2017 and Japanese Patent Application No. 2018-193166, filed Oct. 12, 2018, all of which are hereby incorporated by reference herein in their entirety.

BACKGROUND OF THE INVENTION

Field of the Invention

The present invention relates to a terahertz wave camera, a detection module, and the like that are information acquisition devices using a terahertz wave. More specifically, the present invention relates to a technique for suppressing influence on a function of acquiring information on an electromagnetic wave having a wavelength different from a terahertz wave.

Description of the Related Art

A terahertz wave is a radio wave typically having a signal of any frequency band out of a range from 0.2 THz to 30 THz. In the frequency band, there is much characteristic absorption caused by the structure or the state of various substances such as a biomolecule or a resin. Because of having a larger wavelength than visible light or infrared light, a terahertz wave is less likely to be affected by scattering and has high transmittance for many substances. On the other hand, a terahertz wave has a shorter wavelength than a millimeter wave that is also a radio wave. Thus, in a radio wave camera using a terahertz wave (also referred to as a terahertz wave camera), an image having high resolution can be expected compared to an image generated from a millimeter wave. By making use of these characteristics, application to safe imaging techniques instead of X-rays is expected. For example, application to security check in public places and a surveillance technique has been considered.

In radio wave cameras, there are a passive type that selects and detects a desired radio wave out of an electromagnetic wave (radio wave and light) generated from a subject due to heat radiation and an active type that irradiates a subject with a desired radio wave and detects a reflected radio wave. Since the radio wave generated from a subject due to heat radiation is very weak, many passive type radio wave cameras realize selection of a radio wave and reduction of noise of a system by using a high frequency circuit such as a mixer. Since a high frequency circuit technique driven in a terahertz wave band is under development, an active type terahertz wave camera is often considered in order to ensure a required SN ratio.

In both types of terahertz wave cameras, a signal of a terahertz wave is weak and fast. Thus, a technique for avoiding an increase in noise due to a parasitic component of a circuit and deterioration of the frequency characteristic by integrating an element that detects a signal and a peripheral circuit (also referred to as readout circuit) that reads out a signal is disclosed (see Japanese Patent Application Laid-Open No. 2014-175819, FIG. 1A, FIG. 1B, FIG. 6, FIG. 7, and the like).

A peripheral circuit integrated in an element that detects a terahertz wave and reads out a signal related to a terahertz wave is often formed of a silicon-based semiconductor circuit (for example, CMOS) having high spectral sensitivity to visible light and infrared light. Here, since a signal related to a terahertz wave is weak, it is desirable that a terahertz wave camera use a lens with an F value as low as possible and collect a terahertz wave to an element that detects a terahertz wave. At this time, when visible light or infrared light is emitted to a peripheral circuit, unnecessary charges are generated by influence of a photoelectric effect inside the circuit due to the visible light or the infrared light. Such unnecessary charges may cause noise, and the SN ratio may decrease.

SUMMARY OF THE INVENTION

In view of the problems described above, a terahertz wave camera according to one aspect of the present disclosure is a terahertz wave camera that detects a terahertz wave from a measurement target and acquires information on the measurement target, and the terahertz wave camera includes: a sensor unit in which a plurality of detection elements having spectral sensitivity to the terahertz wave are arranged; a readout circuit unit that reads out signals from the detection elements; a first light-shielding portion that reduces disturbance light to which the readout circuit unit has spectral sensitivity; and an optical unit that guides a terahertz wave from the measurement target to the sensor unit.

According to another aspect of the present disclosure, provided is a detection module used for a terahertz wave camera that detects a terahertz wave from a measurement target and acquires information on the measurement target, and the detection module includes: a sensor substrate; a plurality of detection elements provided on a first primary face of the sensor substrate and having spectral sensitivity to the terahertz wave; a first light-shielding portion that reduces disturbance light other than the terahertz wave and is arranged in a different level from the detection elements in sectional view of the sensor substrate; a readout circuit substrate provided so as to face a second primary face of the sensor substrate; and a readout circuit unit that is provided on the readout circuit substrate, has spectral sensitivity to the disturbance light, and reads out signals from the detection elements.

Further features of the present disclosure will become apparent from the following description of exemplary embodiments with reference to the attached drawings.

DESCRIPTION OF THE EMBODIMENTS

A typical silicon-based general-purpose circuit used as a readout circuit unit of a terahertz wave sensor unit has spectral sensitivity to disturbance light such as visible light. Further, in a high frequency circuit for a millimeter wave, a terahertz wave, or the like, in particular, influence of a parasitic component caused by laying a wiring around is not negligible. It is therefore desirable that a peripheral circuit, which is a readout circuit unit, be arranged as close as possible to a sensor unit. From this point of view, a terahertz wave camera that acquires information on a measurement target has a sensor unit having spectral sensitivity to a terahertz wave, a readout circuit unit, and a light-shielding portion that reduces undesirable disturbance light. In the present specification, "reduce light" and "block light" may mean reducing the amount or intensity of disturbance light toward the readout circuit unit. The readout circuit unit is preferably arranged close to the sensor unit. Herein, whether it is "close to" or not is determined by considering whether or not a parasitic component caused by laying a wiring around in the readout circuit unit prevents establishment of a performance condition required by a device including the sensor unit and the readout circuit unit. Whether it is "disturbance light" or not is determined by whether or not the wavelength range is in a wavelength range of spectral sensitivity of the readout circuit unit, and there may be some deviation or the like. Hereinafter, while embodiments and examples will be described, the present invention is not limited thereto, and various modifications or changes are possible within the scope not departing from the spirit of the present invention to realize a configuration that can solve the above problems.

According to study by the present inventors, it has been found that, since a signal of a terahertz wave is weak, influence of noise due to unnecessary charges is not a negligible problem in structuring a terahertz wave camera. As described above, for a peripheral circuit integrated near the detection element of a terahertz wave, suppression of influence of noise due to unnecessary charges caused by visible light or infrared light is a problem specific to a terahertz wave camera using a detection element and a peripheral circuit for a terahertz wave that have different spectral sensitivity.

According to one aspect of the present invention, a configuration that reduces light of an undesirable electromagnetic wave (disturbance light such as visible light or infrared light) that may reach a circuit unit used for reading out a signal of an element that detects a terahertz wave can be employed.

First Embodiment

Figure 1A:
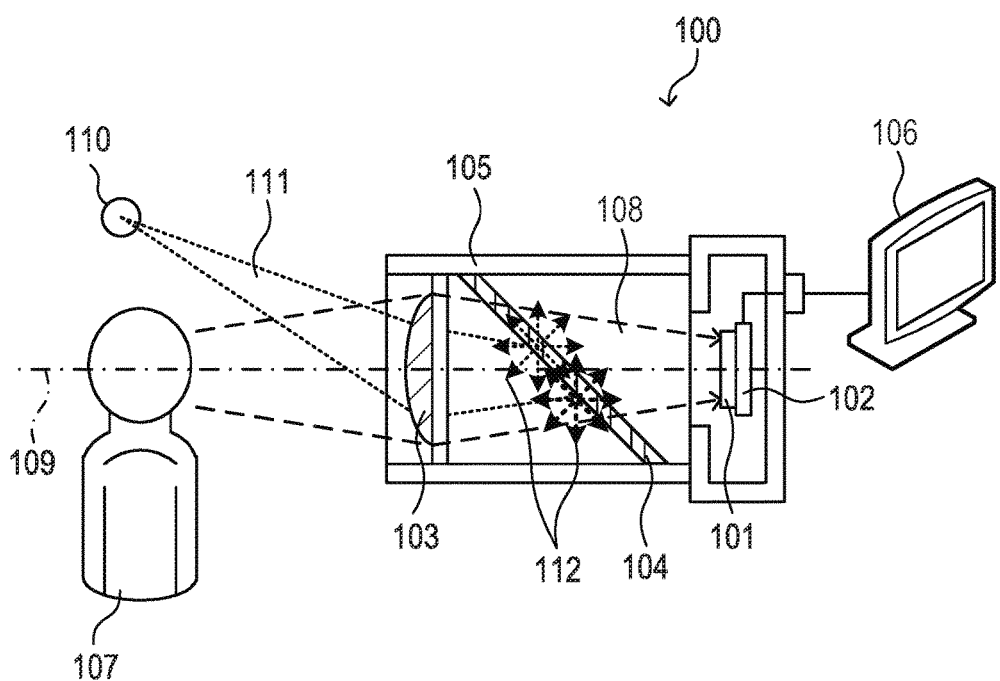
FIG. 1A is a diagram illustrating a configuration of a terahertz wave camera of a first embodiment.
Figure 1B:
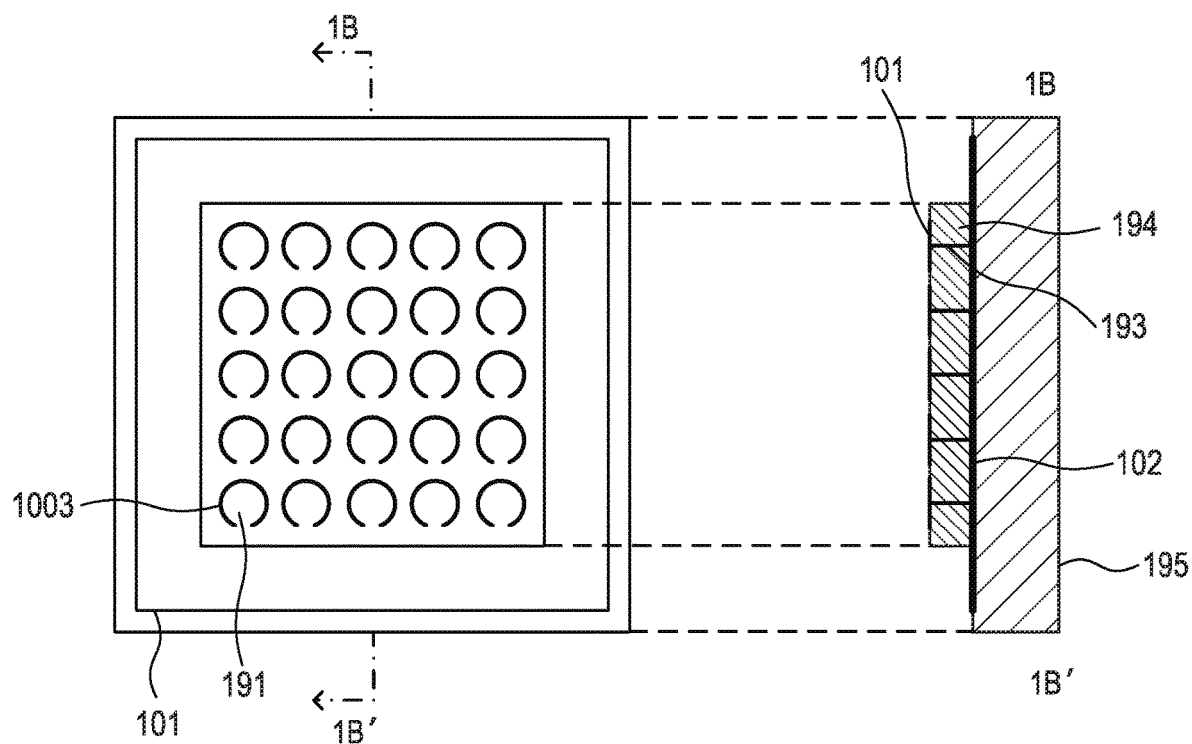
FIG. 1B is a plan view and a sectional view of a detection module of the first embodiment.

A first embodiment of the present invention will be described with reference to the drawings. FIG. 1A and FIG. 1B are schematic configuration diagrams of a terahertz wave camera of the present embodiment. FIG. 1A is a diagram illustrating a configuration of a terahertz wave camera 100, and FIG. 1B is a plan view and a sectional view of a detection module including a configuration around a sensor unit 101 of the terahertz wave camera 100.

The terahertz wave camera 100 of FIG. 1A has at least a first light-shielding portion 103, the sensor unit 101, and a readout circuit unit 102. Such components are accommodated in a camera casing 105. The terahertz wave camera 100 detects and images a terahertz wave 108 from a subject 107. An imaged terahertz wave image is displayed on a monitor 106, if necessary. The terahertz wave 108 from the subject 107 is a terahertz wave generated by the subject 107 due to heat radiation or a terahertz wave emitted from an external lighting and then reflected by the subject 107. A terahertz wave is a radio wave and preferably has a signal in any frequency band out of a range from 0.2 THz to 30 THz.

The first light-shielding portion 103 blocks disturbance light 111 and guides the terahertz wave 108 to the sensor unit 101. In principle, although the first light-shielding portion 103 can be divided into a light-shielding portion having a function of blocking light and an optical unit having a function of image capturing, when the first light-shielding portion 103 has both functions of blocking light and image capturing, the number of components forming the terahertz wave camera 100 can be reduced. The disturbance light 111 is visible light or infrared light generated from a disturbance light source 110 and is an electromagnetic wave other than a terahertz wave. The disturbance light source 110 is a lighting apparatus, natural light, a heat source, or the like. The first light-shielding portion 103 has optical power to capture an image of the terahertz wave 108 onto the sensor unit 101 and is a convex lens, for example. The first light-shielding portion 103 is formed of a member that transmits the terahertz wave 108.

While the first light-shielding portion 103 is formed of one lens in FIG. 1A, the first light-shielding portion 103 may be formed of a plurality of lenses. Further, it is desirable that the first light-shielding portion 103 is a member that absorbs and scatters the disturbance light 111 in order to block the disturbance light 111. For example, as a material of a member that blocks the disturbance light 111 and transmits the terahertz wave 108, materials such as high density polyethylene (HDPE), Teflon (registered trademark) (trade name: PolyTetraFluoroethylene, PTFE), high resistance silicon, or the like having transmittance to a terahertz wave higher than transmittance to disturbance light can be applied. With a use of such a material, the first light-shielding portion 103 that transmits the terahertz wave 108 and absorbs the disturbance light 111 can be formed. Further, with the structure such as a porous structure that scatters the disturbance light 111 being contained in the member, the first light-shielding portion 103 that transmits the terahertz wave 108 and scatters the disturbance light 111 can be formed.

A lens may collect not only the terahertz wave 108 but also the disturbance light 111. As with the present embodiment, however, the first light-shielding portion 103 having a function of a lens blocks the disturbance light 111 by the configuration as described above. Thus, since it is possible to suppress the disturbance light 111 from being collected to a peripheral circuit, generation of unnecessary charges, which is caused by influence of a photoelectric effect inside a circuit due to the disturbance light 111, can be suppressed. As a result, an advantage of reduction of noise can be obtained, the SN ratio of the terahertz wave camera 100 can be improved.

A support portion that supports the first light-shielding portion 103 in the camera casing 105 is formed of a material that transmits at least the terahertz wave 108, or the center part of the support portion is opened. Further, another part of the camera casing 105 is preferably formed of a material that transmits neither the disturbance light 111 nor the terahertz wave 108 and is formed of a material that does not transmits at least the disturbance light 111.

The sensor unit 101 has a plurality of elements (pixels) 191 arranged two-dimensionally in a matrix, and the element 191 has spectral sensitivity to the terahertz wave 108. The sensor unit 101 is formed in a sensor substrate 194. To have spectral sensitivity to the terahertz wave 108, the elements 191 of the sensor unit 101 have the structure in which a detection element such as a Schottky barrier diode (SBD) made of a compound semiconductor or a semiconductor and an antenna are integrated, for example. Further, the detection element of the element 191 may be a rectifying detection element such as a self-switching diode or a metal-insulator-metal (MIM) diode, a transistor such as a field effect transistor (FET) or a high electron mobility transistor (HEMT), or a detection element using a quantum well. In a terahertz wave camera, the element 191 corresponds to a pixel.

Figure 10A:
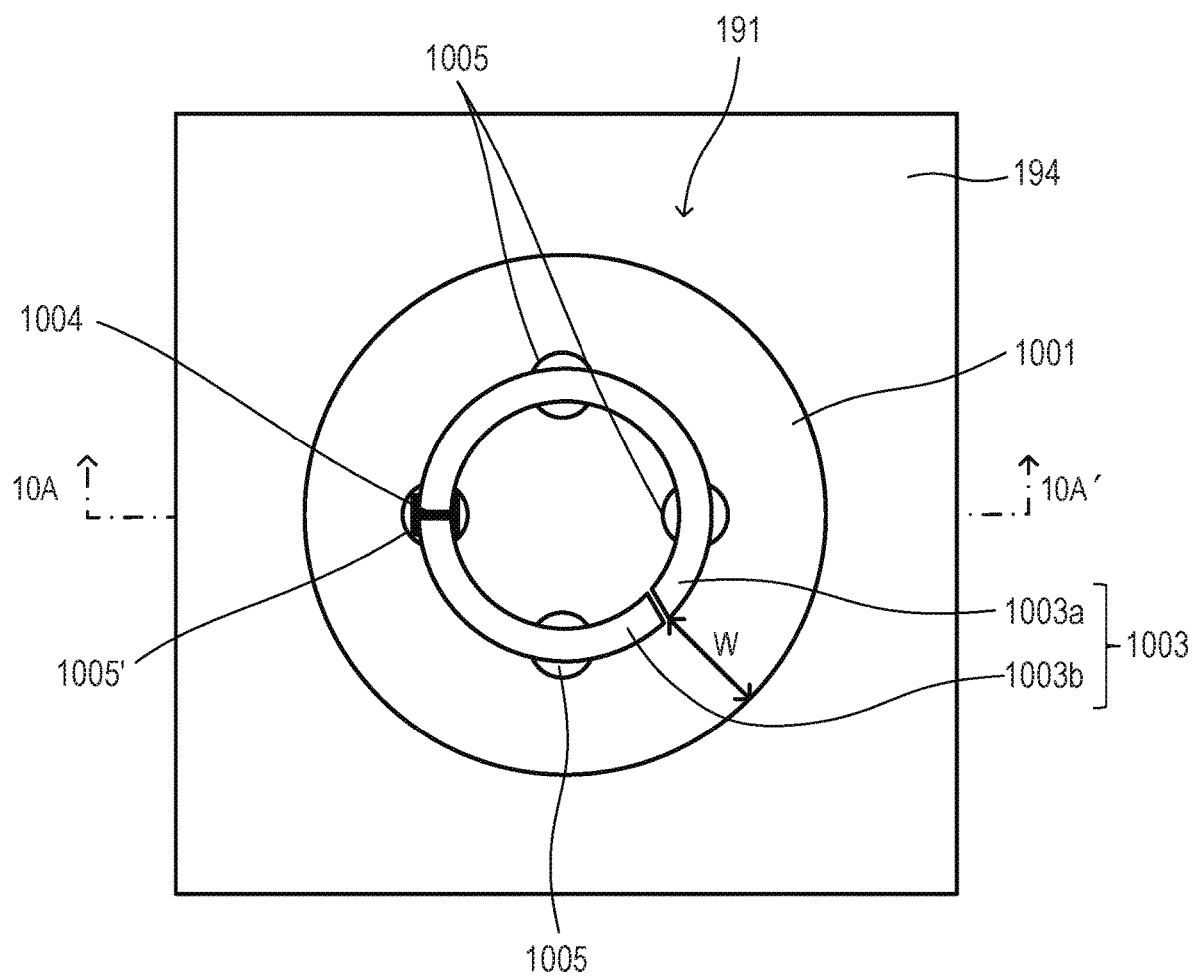
FIG. 10A is a plan view of an element of the first embodiment.
Figure 10B:
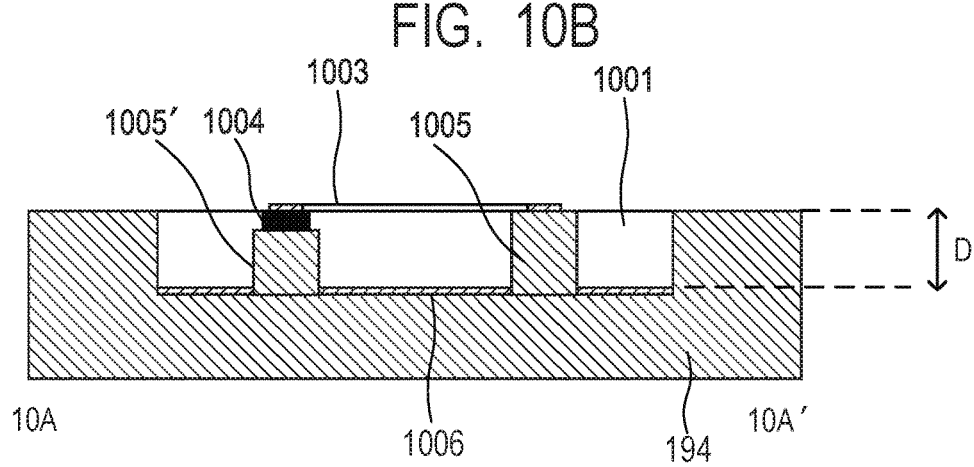
FIG. 10B is a sectional view of the element of the first embodiment.
Figure 10C:
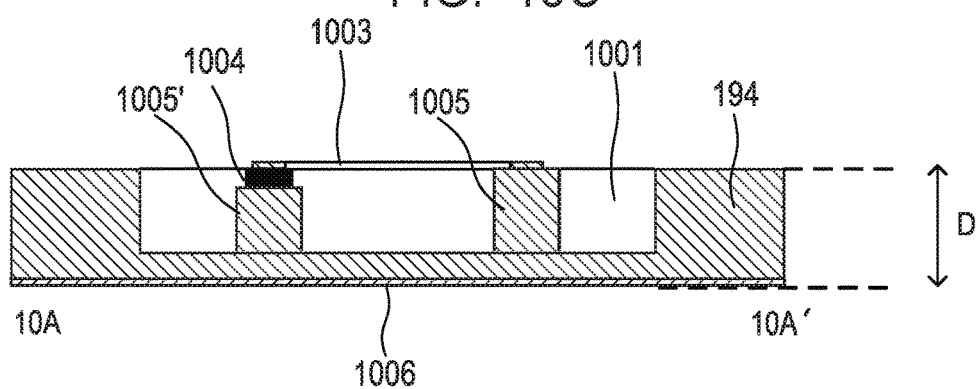
FIG. 10C is a sectional view of the element of the first embodiment.

As the elements 191 of the sensor unit 101, the following can be used. FIG. 10A, FIG. 10B, and FIG. 10C are diagrams illustrating configuration examples of the element 191. FIG. 10A is a plan view of the element 191, and FIG. 10B and FIG. 10C are sectional views of the element 191 of FIG. 10A. FIG. 10C further illustrates the element 191 as a modified example.

In FIG. 10A, the element 191 may have a sensor substrate 194 in which a recess (concave part) 1001 is formed, an antenna 1003, and a detection element 1004. On the sensor substrate 194, the recesses 1001 are formed on an element 191 basis, and the recess 1001 forms a circle in plan view. The recess 1001 is formed of an inner wall part that reflects a received electromagnetic wave. The inner wall part may be formed of a side wall, a bottom part, or the like of the recess 1001. On the bottom part of the recess 1001, support portions 1005 and 1005' are provided in a protruding manner. Each of the support portions 1005 and 1005' has a cylindrical shape, and the height of the support portion 1005' is smaller than the height of the support portion 1005. The detection element 1004 is provided on the top face of the support portion 1005'. The antenna 1003 that receives an electromagnetic wave is fixed on the support portions 1005 and 1005'. The antenna 1003 has an annular shape in plan view and is formed of metal portions 1003a and 1003b. The length of the metal portion 1003a is larger than the length of the metal portion 1003b. One ends of respective metal portions 1003a and 1003b are connected to the detection element 1004, and an air gap having a predetermined width is formed between the other ends of respective metal portions 1003a and 1003b. Herein, the metal portions 1003a and 1003b each have a portion provided on an opening of the recess 1001 and a portion connected to the detection element 1004 arranged on the support portion 1005' that is provided on the sensor substrate 194.

As illustrated in FIG. 10A and FIG. 10B, the support portion 1005 also supports the antenna 1003. The inner wall of the recess 1001 that reflects an electromagnetic wave reflects an electromagnetic wave by using a difference in the refractive index of the interface between the sensor substrate 194 and the recess 1001. As illustrated in FIG. 10B, a metal layer 1006 may be provided on the bottom face of the recess 1001 as the structure that reflects an electromagnetic wave. Further, as illustrated in FIG. 10C, the metal layer 1006 may be provided on a back face of the sensor substrate 194. When a distance W between the antenna 1003 and the side wall of the recess 1001 changes, a radiation pattern of an electromagnetic wave of the element 191 changes. It is therefore preferable that the distance W have a sufficient length so that the radiation pattern is not disturbed. Preferably, the distance W is $0.1\lambda$ or longer with respect to a wavelength $\lambda$ that is an effective electromagnetic wave. Further, the radiation direction of an electromagnetic wave changes in accordance with a distance D of the metal layer 1006 to the front face of the sensor substrate 194. Specifically, the radiation direction of an electromagnetic wave is determined to be concentrated above the antenna 1003 or concentrated inside the sensor substrate 194 in accordance with the distance D. In the present embodiment, the metal layer 1006 is arranged at a position at which the radiation pattern is concentrated above the sensor substrate 194. Preferably, the distance D is $0.25\lambda$ with respect to the wavelength $\lambda$ that is an effective electromagnetic wave.

For example, when an electromagnetic wave of 0.5 THz is used, the radius of the antenna 1003 is 65 µm. At this time, when the antenna 1003 and the recess 1001 are filled with air, the distance W is 60 µm. When the element 191 has the sectional structure illustrated in FIG. 10B, and the sensor substrate 194 is formed of silicon, the distance D is 60 µm.

Note that, while the support portion 1005 of FIG. 10A and FIG. 10B has a cylindrical shape, the shape is not limited thereto. For example, the support portion 1005 may have a prism shape or may have a trapezoid shape. Further, a space surrounded by the recess 1001 may be filled with not only air but also a material having a refractive index that is different from a refractive index of air. For example, the space of the recess 1001 may be filled with benzocyclobutene (BCB) that is a resin material.

The metal layer 1006 formed on the sensor substrate 194 can also serve as a light-shielding portion for visible light and infrared light that are disturbance light. In other words, the sensor substrate 194 has a light-shielding portion that reflects disturbance light to a different level from the detection element 1004. Note that a light-shielding portion having a dielectric multilayer film structure that reflects disturbance light may be provided to a part other than the metal layer 1006 or may be formed partially or entirely for a level on which the light-shielding portion is arranged. With such a configuration, the disturbance light that would otherwise reach a readout circuit unit described later can be blocked.

Turning back to FIG. 1A, the sensor unit 101 may be configured such that a plurality of pixels each having a detection element that detects an electromagnetic wave from a subject and a plurality of switches used for reading out signals from the pixels may be arranged, respectively. Here, the sensor unit 101 has a generation unit that generates a signal of a predetermined cycle, and the pixel is connected to a transmission line used for supplying a signal of a predetermined cycle to the pixel and a scan line used for reading out a signal from the pixel via a switch. Further, the pixel has a frequency conversion element that performs a frequency conversion on a detection signal of the detection element by using a signal of a predetermined cycle.

The readout circuit unit 102 is a circuit that reads out a signal related to the terahertz wave 108 from the element 191. The readout circuit unit 102 includes an amplifier circuit, a filter circuit, a switch circuit, a power source circuit, or the like, and a general-purpose semiconductor circuit technique such as a CMOS circuit technique can be applied thereto, for example. Since a semiconductor used for such a circuit has high spectral sensitivity to a wavelength range of visible light or infrared light, the disturbance light 111 causes noise due to unnecessary charges of the circuit. Therefore, to remove a cause of the noise, the first light-shielding portion 103, a second light-shielding portion 104 described later, and the like are provided. As illustrated in FIG. 1B, the readout circuit unit 102 is formed on a readout circuit substrate 195. The readout circuit unit 102 and the sensor unit 101 are integrally formed. In the present example, the readout circuit substrate 195 and the sensor substrate 194 are coupled and integrated. To integrate the readout circuit substrate 195 and the sensor substrate 194, the readout circuit substrate 195 and the sensor substrate 194 may be provided on the front face and the back face of a common substrate, respectively.

FIG. 1B illustrates a plan view of a sensor unit and a readout circuit unit and a sectional view taken along a dashed line 1B-1B' and is a diagram illustrating an arrangement example of the sensor unit 101 and the readout circuit unit 102. As illustrated in FIG. 1B, the sensor unit 101 and the readout circuit unit 102 are stacked and connected to each other via a through electrode 193 provided in the sensor substrate 194. The sensor unit 101 is provided on a first primary face of the sensor substrate 194, and the readout circuit substrate 195 is opposed thereto and provided on a second primary face of the sensor substrate 194. In more detail, the sensor substrate 194 having the sensor unit 101 and the readout circuit substrate 195 having the readout circuit unit 102 are arranged to be attached to each other along an optical axis 109 of the terahertz wave camera 100. The readout circuit substrate 195 is arranged to be opposed to the first light-shielding portion 103 with the sensor substrate 194 being interposed therebetween.

According to such arrangement, since at least a part of the readout circuit unit 102 is shielded by the sensor unit 101, a circuit exposure portion of the readout circuit unit 102 decreases. Thus, since a region in which the disturbance light 111 reaches the readout circuit unit 102 decreases, the influence of noise due to unnecessary charges of the circuit is reduced, and the noise characteristic is improved. As a result, the SN ratio of the terahertz wave camera 100 is improved.

Figure 7:
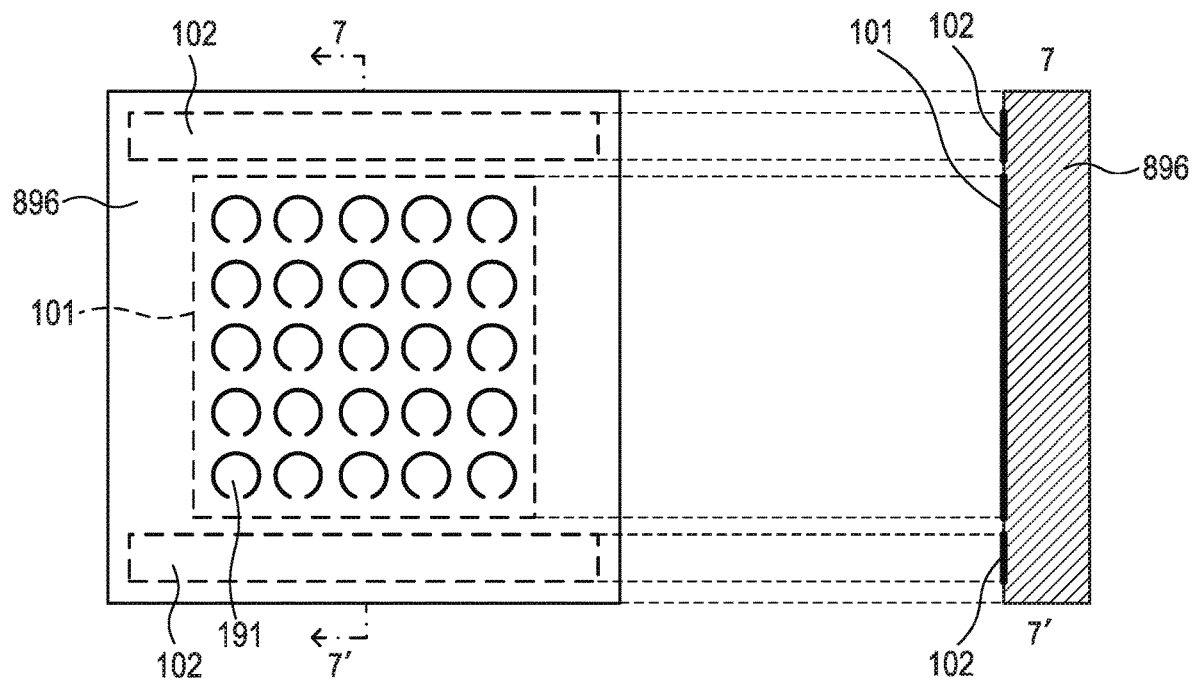
FIG. 7 is a diagram illustrating a plan view and a sectional view of another arrangement example of a detection module of the first embodiment.

The arrangement of the sensor unit 101 and the readout circuit unit 102 is not limited to the form of being attached as described above. FIG. 7 illustrates a plan view of a detection module including a sensor unit and a readout circuit unit as a modified example and a sectional view taken along a dashed line 7-7'. As illustrated in FIG. 7, the sensor unit 101 and the readout circuit units 102 may be integrally arranged on the same face on the first light-shielding portion 103 side of a module substrate 896. Here, the readout circuit units 102 are arranged in two regions that are different from each other near a region of the sensor unit 101. For example, the readout circuit units 102 may be arranged so as to interpose the sensor unit 101 in plan view. The readout circuit units 102 in the two regions are electrically connected to each other by a wiring or the like formed on the top face or in the inner region of the module substrate 896.

The sensor unit 101 has spectral sensitivity to the terahertz wave 108, and the readout circuit unit 102 has spectral sensitivity to the disturbance light (visible light and infrared light) 111 and is integrally arranged with the sensor unit 101. The first light-shielding portion 103 shields the sensor unit 101 and the readout circuit units 102 from the disturbance light 111. Further, the first light-shielding portion 103 captures an image of the terahertz wave 108 onto the sensor unit 101. Since the first light-shielding portion 103 blocks visible light or infrared light that would otherwise reach the readout circuit units 102, the noise due to the unnecessary charges of the readout circuit units 102 is suppressed.

In the present embodiment, while the first light-shielding portion 103 is intended for blocking the disturbance light 111, the disturbance light 111 from a part other than the first light-shielding portion 103 may invade the inside of the terahertz wave camera 100. Accordingly, as illustrated in FIG. 1A, a second light-shielding portion 104 that transmits the terahertz wave 108 may be provided in the terahertz wave camera 100. The second light-shielding portion 104 is arranged along the optical axis 109 of the terahertz wave camera 100 in the same manner as the first light-shielding portion 103. In FIG. 1A, the second light-shielding portion 104 is arranged between the first light-shielding portion 103 and the sensor unit 101 along the optical axis 109 of the terahertz wave camera 100. According to such an arrangement, since the second light-shielding portion 104 is inserted between the first light-shielding portion 103 and the sensor unit 101, it is not required to change the size of an optical system of the terahertz wave camera 100. However, the arrangement of the second light-shielding portion 104 is not limited thereto, and the second light-shielding portion 104 may be arranged at a position opposed to the sensor unit 101 via the first light-shielding portion 103, for example. In such a case, since the second light-shielding portion 104 is arranged at the end (left end in FIG. 1A) of the terahertz wave camera 100, it is possible to easily replace the second light-shielding portion 104 without disassembling the terahertz wave camera 100.

In FIG. 1A, the second light-shielding portion 104 is arranged in the camera casing 105 so as to be inclined with respect to the optical axis 109. That is, the axis perpendicular to the surface of the second light-shielding portion 104 is not parallel to the optical axis 109. By arranging the second light-shielding portion 104 so as to be inclined with respect to the optical axis 109, for example, it is possible to prevent the disturbance light 111 reflected on the surface of the sensor unit 101 or the readout circuit unit 102 from being reflected at the surface of the second light-shielding portion 104, traveling along the same light path, and re-entering the readout circuit unit 102. According to such arrangement, since the disturbance light 111 that re-enters the readout circuit unit 102 can be suppressed, noise due to unnecessary charges of the readout circuit unit 102 can be more suppressed.

The second light-shielding portion 104 blocks the disturbance light 111 by absorbing or scattering the disturbance light 111 or the like in the same manner as the first light-shielding portion 103. The second light-shielding portion 104 in FIG. 1A has the structure that scatters the disturbance light 111, and an example of outputting scattering light 112 is illustrated.

Figure 2:
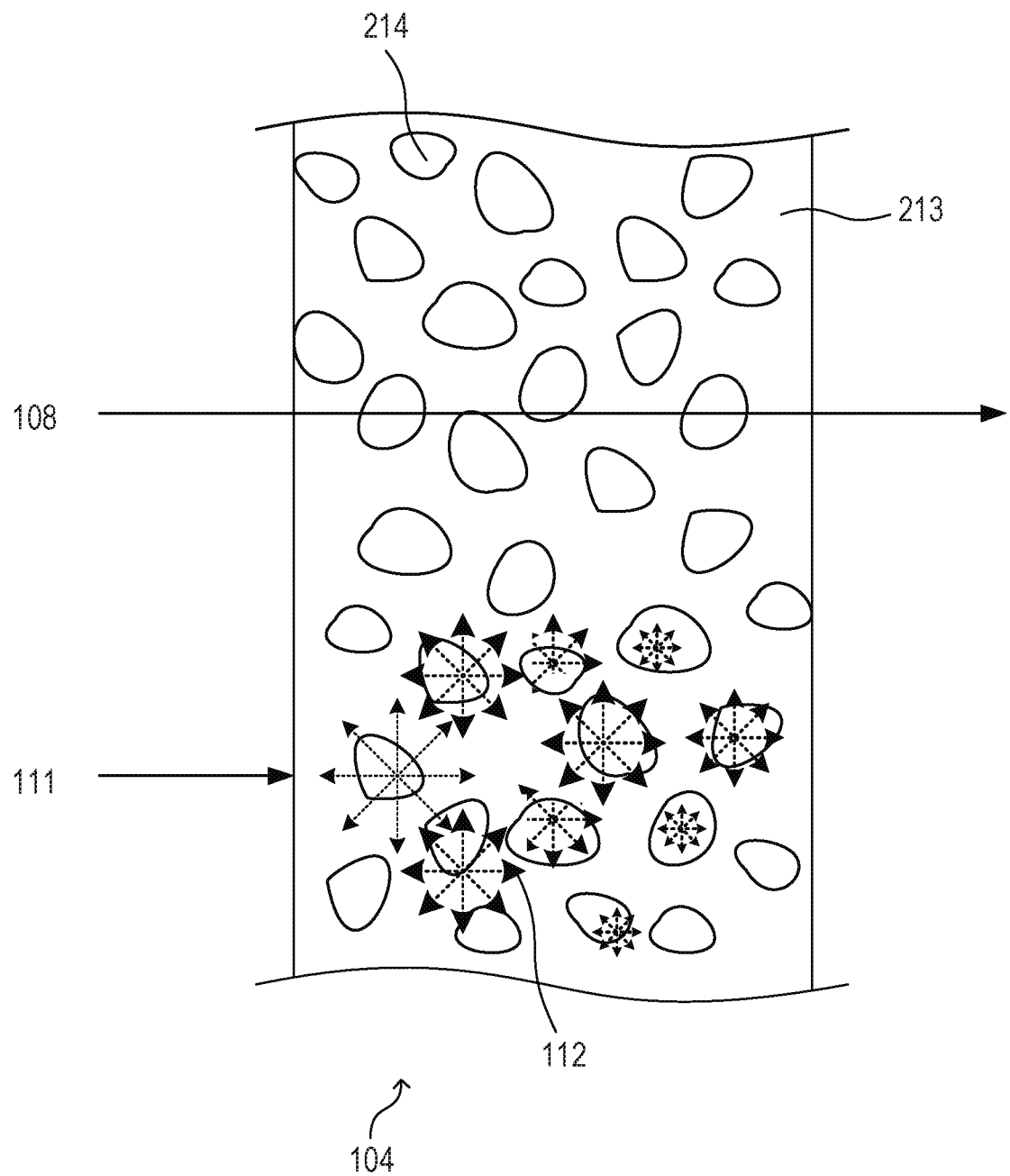
FIG. 2 is a sectional view illustrating an example of the structure that scatters disturbance light of a second light-shielding portion.

FIG. 2 is a diagram illustrating an example of the structure that scatters the disturbance light 111 in the second light-shielding portion 104, which illustrates a sectional view of a part of the second light-shielding portion 104. The second light-shielding portion 104 has a member 213 in which a plurality of air hole parts 214 are formed. The scattering structure of the second light-shielding portion 104 corresponds to the air hole parts 214 provided in the member 213. The material of the member 213 is a material that has transmittance to the terahertz wave 108. The disturbance light 111 is absorbed at the member 213, is scattered at the interface between an air hole of the air hole part 214 and the member 213, and becomes the scattering light 112. Such a scattering phenomenon is caused by geometrical optic scattering and the Mie scattering. Thus, the size of the air hole part 214 is required to be substantially the same as or larger than the wavelength of the disturbance light 111. Further, the structure of the air hole part 214 is required to have transmittance to the terahertz wave 108. Thus, the size of the air hole part 214 is required to be substantially the same as or smaller than the wavelength of the terahertz wave 108. Alternatively, the distance between adjacent air hole parts 214 is required to be substantially the same as or smaller than the wavelength of the terahertz wave 108. Specifically, it is desirable that the size of the air hole part 214 be $1/10 \times \lambda 1$ or smaller with respect to a wavelength $\lambda 1$ of the terahertz wave 108. Alternatively, it is desirable that the distance between the adjacent air hole parts 214 be $1/10 \times \lambda 1$ or smaller with respect to a wavelength $\lambda 1$ of the terahertz wave 108. Further, it is desirable that the size of the air hole part 214 be $\lambda 2$ or larger with respect to a wavelength $\lambda 2$ of the disturbance light 111. As the second light-shielding portion 104, styrene foam, polyethylene foam, or the like having a controlled size of the air hole part 214 can be used.

Figure 3:
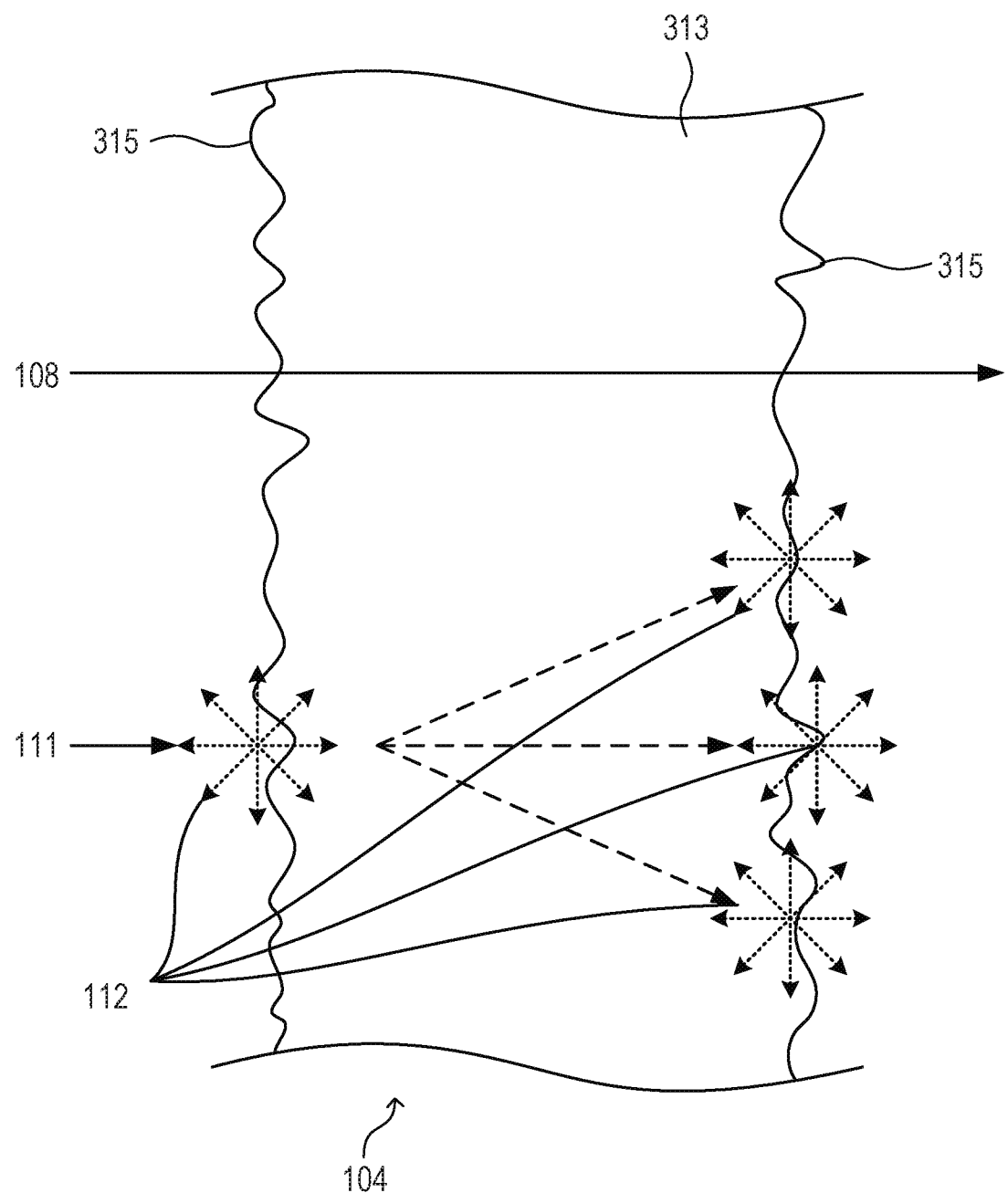
FIG. 3 is a sectional view illustrating another example of the structure that scatters disturbance light of the second light-shielding portion.

FIG. 3 illustrates an example of another structure that scatters the disturbance light 111 in the second light-shielding portion 104, which illustrates a sectional view of a part of the second light-shielding portion 104. The second light-shielding portion 104 has a member 313 in which an unevenness portion 315 is formed on the surface. The scattering structure of the second light-shielding portion 104 is the unevenness portion 315 provided on the surface of the member 313. The member 313 is a material having transmittance to the terahertz wave 108. The disturbance light 111 is absorbed in the member 313 and scattered at the interface between the unevenness portion 315 and the atmosphere (for example, air) surrounding the second light-shielding portion 104. Such a scattering phenomenon is caused by geometrical optic scattering and the Mie scattering. Thus, the size (the depth, the width, or the like of the unevenness) of the unevenness portion 315 is required to be substantially the same as or larger than the wavelength of the disturbance light 111. Further, to suppress scattering of the terahertz wave 108 due to the unevenness portion 315, the size of the unevenness portion 315 is required to be substantially the same as or smaller than the wavelength of the terahertz wave 108. Specifically, it is desirable that the size of the unevenness portion 315 be $1/10 \times \lambda 1$ or smaller with respect to a wavelength $\lambda 1$ of the terahertz wave 108. Further, it is desirable that the size of the unevenness portion 315 be $\lambda 2$ or larger with respect to a wavelength $\lambda 2$ of the disturbance light 111. As the second light-shielding portion 104, polyethylene whose surface is processed to be a sand surface, a quartz substrate, or the like can be used, for example.

As set forth, in the present embodiment, a configuration that blocks the disturbance light 111 is provided to a configuration in which the sensor unit 101 and the readout circuit unit 102 having different spectral sensitivity are integrated. According to such a configuration, the sensor unit 101 having spectral sensitivity to the terahertz wave 108 and the readout circuit unit 102 having spectral sensitivity to the disturbance light (visible light and infrared light) 111 and arranged integrally with the sensor unit 101 are shielded from the disturbance light 111 by the first light-shielding portion 103 and the second light-shielding portion 104. Further, the first light-shielding portion 103 captures an image of the terahertz wave 108 onto the sensor unit 101. Since the first light-shielding portion 103 and the second light-shielding portion 104 blocks, in two steps, visible light and infrared light that would otherwise reach the readout circuit unit 102, noise due to unnecessary charges of the readout circuit unit 102 is further suppressed. Thus, noise in the terahertz wave camera 100 is reduced, and the SN ratio of the terahertz wave camera 100 is further improved.

In particular, as illustrated in FIG. 2 and FIG. 3, when the second light-shielding portion 104 has the structure that scatters the disturbance light 111, the disturbance light 111 is diffused by scattering. Thus, since the light amount of the disturbance light 111 reaching the readout circuit unit 102 is reduced, noise in the terahertz wave camera 100 is further reduced, and the SN ratio of the terahertz wave camera 100 is improved. Note that the structure that scatters disturbance light may be provided to the first light-shielding portion. That is, the structure that scatters disturbance light can be provided at least one of the first light-shielding portion and the second light-shielding portion.

Example 1

Specific examples of materials of each member, numerical values, and the like of the terahertz wave camera of the first embodiment will be described with reference to the drawings. The present invention is not limited to the following examples. The terahertz wave camera of the present example is the active type terahertz wave camera that irradiates a subject with a terahertz wave.

The frequency of the terahertz wave 108 of FIG. 1A ranges from 0.43 THz to 0.5 THz. The terahertz wave 108 is a reflected wave that is emitted from a terahertz wave source (not illustrated) to the subject 107 and reflected by the subject 107. The terahertz wave source is a flat light source in which a plurality of terahertz wave sources are arranged in a matrix. In more detail, the terahertz wave source is an element in which a resonance tunnel diode (RTD) and a patch antenna, which is a resonator, are integrated, and the output of the terahertz wave source is slightly lower than 0.1 mW. In the present example, the terahertz wave source is a flat light source in which 25 elements of terahertz wave sources are arranged. The number of arranged terahertz wave sources is not limited thereto. Further, the configuration of the terahertz wave source is not limited to the above, and a known terahertz wave source can be used. The disturbance light source 110 is indoor lighting or natural light.

The first light-shielding portion 103 is also a non-sphere biconvex lens, and the material thereof is high density polyethylene (HDPE). The first light-shielding portion 103 blocks the disturbance light 111 that is visible light and transmits the terahertz wave 108. The focal distance and the working distance of the first light-shielding portion 103 are 100 mm and 400 mm, respectively. Further, the magnification of the first light-shielding portion 103 is 0.33, and this causes an image of the subject 107 to be captured on the sensor unit 101.

The second light-shielding portion 104 is a polystyrene board having a thickness of 5 mm, and the size of the air hole part 214 is approximately 100 μm. Further, the distance between adjacent air hole parts 214 is approximately 20 μm. As illustrated in FIG. 1A, the second light-shielding portion 104 is installed diagonally with respect to the optical axis 109 of the camera 100. The second light-shielding portion 104 further blocks the disturbance light 111 leaked from the first light-shielding portion 103.

The element 191 of the sensor unit 101 is a Schottky barrier diode (SBD) on which antennae are integrated. Each antenna is a loop antenna, and the resonance frequency of the antenna has been adjusted to the frequency of a terahertz wave generated from the RTD described above. The element 191 is a photoelectric conversion element that converts a signal of the terahertz wave 108 into an electrical signal. The sensor unit 101 includes, for example, 4096 elements 191 arranged in a matrix, and the size of the sensor unit 101 is approximately 32 mm×32 mm. With such a configuration, the sensor unit 101 has spectral sensitivity to a terahertz wave.

The readout circuit unit 102 is a line readout circuit and has a switch circuit and a shift register circuit that select a position of a line, a bias circuit that determines an operation point of the element 191 of the sensor unit 101, a circuit that converts the output of the element 191 into a charge signal, and the like. These circuits are formed on a silicon-based semiconductor substrate and thus have a high spectral sensitivity to visible light and infrared light.

As illustrated in FIG. 1B, the sensor substrate 194 and the readout circuit substrate 195 are attached to each other and arranged along the optical axis 109 of the terahertz wave camera 100. Since the sensor substrate 194 and the readout circuit substrate 195 are configured by being attached to each other, a part of the disturbance light 111 is blocked by the sensor unit 101, and the intensity of the disturbance light 111 entering the readout circuit unit 102 decreases.

The output terminal of the readout circuit unit 102 is connected to an amplifier circuit, a filter circuit, a correlated double sampling (CDS) circuit, or the like (which are not illustrated), and a signal associated with the terahertz wave 108 is adjusted and processed. These circuits may be included in the readout circuit unit 102. The terahertz wave camera 100 sequentially selects rows of the sensor unit 101 by using a shift register circuit, acquires signals of the elements 191 included in the rows, and thereby acquires an intensity distribution of a signal associated with the terahertz wave 108. The terahertz wave camera 100 then constructs an intensity distribution image of the terahertz wave 108 (also referred to as a terahertz wave image) by referencing the selected positions of the rows of the sensor unit 101 and arranging signals in the intensity distribution. In constructing the terahertz wave image, the terahertz wave camera 100 may perform image processing such as averaging of terahertz wave images, removal of an unnecessary fixed pattern, or image adjustment such as γ correction. In the present embodiment, image processing of averaging and removal of a fixed pattern are performed. In particular, in the present example, for the purpose of handling a signal after the decimal point in performing image processing, the terahertz wave camera 100 shifts digital data associated with an intensity signal of the terahertz wave 108 by four bits. In other words, the intensity signal of the terahertz wave is multiplied by 16. In the present example, a terahertz wave image is displayed on the monitor 106 and thereby presented to a user.

Noise of the terahertz wave camera 100 under the environment in the absence of the subject 107 was measured by setting the framerate to 40 frames per second (FPS) and utilizing a recursive filter with 512 frames as an averaging process of terahertz wave images. Since the subject 107 is absent, the terahertz wave 108 from the subject 107 is also absent, and the signal detected by the terahertz wave camera 100 is mainly the disturbance light 111. Noise of the terahertz wave camera 100 in the absence of the second light-shielding portion 104 is 8.9 least significant bit (LSB). Compared to this, noise of the terahertz wave camera 100 with arrangement of the second light-shielding portion 104 is 8.1 LSB, and it was confirmed that noise originating in the disturbance light 111 can be reduced by around 10 percent. Under the environment in the presence of the subject 107, since the disturbance light 111 is reflected by the subject 107, and the amount of light entering the terahertz wave camera 100 increases, such a noise reduction effect is more significant.

Second Embodiment

A second embodiment of the present invention will be described with reference to the drawings. The present embodiment is a modified example regarding the arrangement of the first light-shielding portion 103 and the second light-shielding portion 104. Configurations different from the first embodiment will be mainly described, and description of the part common to the description provided so far will be omitted or simplified.

Figure 4A:
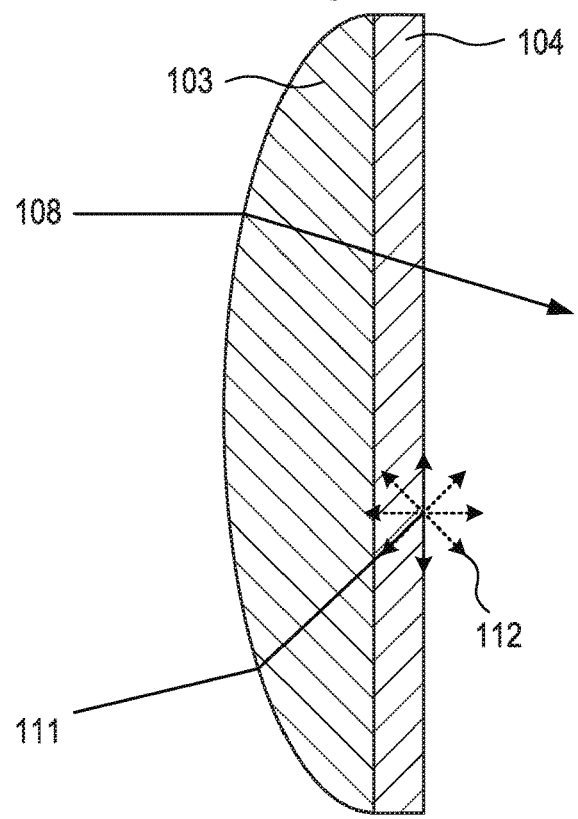
FIG. 4A is a sectional view illustrating an example of an arrangement of a first light-shielding portion and a second light-shielding portion of a second embodiment.
Figure 4B:
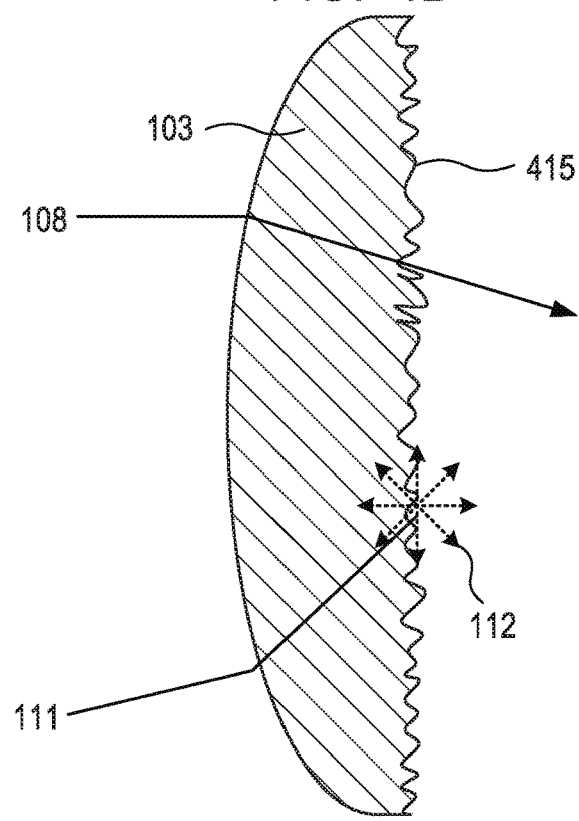
FIG. 4B is a sectional view illustrating an example of an arrangement of the first light-shielding portion and the second light-shielding portion of the second embodiment.

FIG. 4A and FIG. 4B are diagrams illustrating the configuration of the first light-shielding portion 103 and the second light-shielding portion 104 of the present embodiment and illustrate sectional views of the first light-shielding portion 103 and the second light-shielding portion 104. In FIG. 4A, one of the primary surfaces of the first light-shielding portion 103 is curved in a convex shape. The other primary surface of the first light-shielding portion 103 is formed flat and attached to the second light-shielding portion 104. That is, the first light-shielding portion 103 and the second light-shielding portion 104 are integrally formed. At this time, it is desirable that the second light-shielding portion 104 be formed of the scattering structure so as not to deteriorate an image capturing characteristic to the terahertz wave 108 of the first light-shielding portion 103. For example, when the air hole part 214 described in the first embodiment is applied as the scattering structure, the average refractive index to the terahertz wave 108 of the second light-shielding portion 104 is closer to that of the atmosphere. Thus, deterioration of the image capturing characteristic of the first light-shielding portion 103 due to the second light-shielding portion 104 can be suppressed.

Further, FIG. 4B represents a modified example of the first light-shielding portion 103. An unevenness portion 415 is formed on the other primary surface of the first light-shielding portion 103. That is, the unevenness portion 415 that functions as the second light-shielding portion 104 is integrally formed in a part of the first light-shielding portion 103. As described in the first embodiment, when the size of the unevenness portion 415 is less than or equal to $\frac{1}{10} \times \lambda 1$ with respect to the wavelength $\lambda 1$ of the terahertz wave 108, it becomes difficult to detect the structure of the unevenness portion 415 by the terahertz wave 108. Thus, since the unevenness portion 415, which is the second light-shielding portion 104, is considered as an even surface to the terahertz wave 108, deterioration of the image capturing characteristic of the first light-shielding portion 103 due to the second light-shielding portion 104 can be suppressed.

According to the configuration of the present embodiment, since the second light-shielding portion 104 is formed integrally with the first light-shielding portion 103, the holding mechanism of the second light-shielding portion 104 can be eliminated. This enables a reduction in size of the terahertz wave camera 100. Further, the same advantageous effects as those obtained by the first embodiment can be obtained.

Third Embodiment

A third embodiment of the present invention will be described with reference to the drawings. The present embodiment is a modified example of the camera casing 105. Configurations different from the embodiments described above will be mainly described, and description of the common part common will be omitted or simplified.

Figure 5:
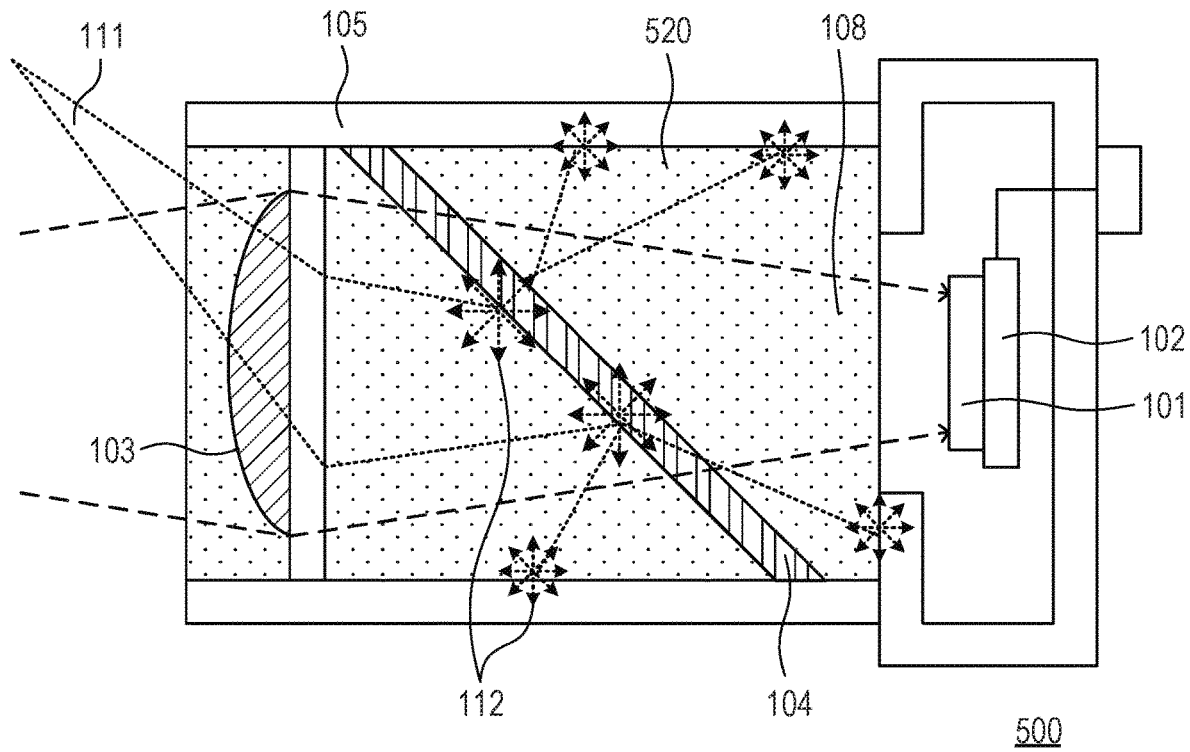
FIG. 5 is a diagram illustrating a configuration of a terahertz wave camera of a third embodiment.

FIG. 5 is a sectional view illustrating the configuration of a terahertz wave camera 500 of the present embodiment. A difference from the configuration of the terahertz wave camera 100 of the embodiments described above is that the camera casing 105 has a third light-shielding portion 520. In more detail, the camera casing 105 has the third light-shielding portion 520 that blocks the disturbance light 111 on the inner wall of the camera casing 105. A flocking sheet that serves as an absorption structure or a sand surface structure that is an unevenness portion that serves as the scattering structure is formed in the third light-shielding portion 520.

According to the configuration of the present embodiment, since the disturbance light 111 reflected at the inner wall of the camera casing 105 can be absorbed or scattered, reflection of unnecessary disturbance light 111 inside the camera casing 105 can be suppressed. Thus, since the light amount of the disturbance light 111 reaching the readout circuit unit 102 is reduced, noise of the terahertz wave camera 500 is further reduced, and the SN ratio of the terahertz wave camera 500 is improved.

Fourth Embodiment

Figure 6:
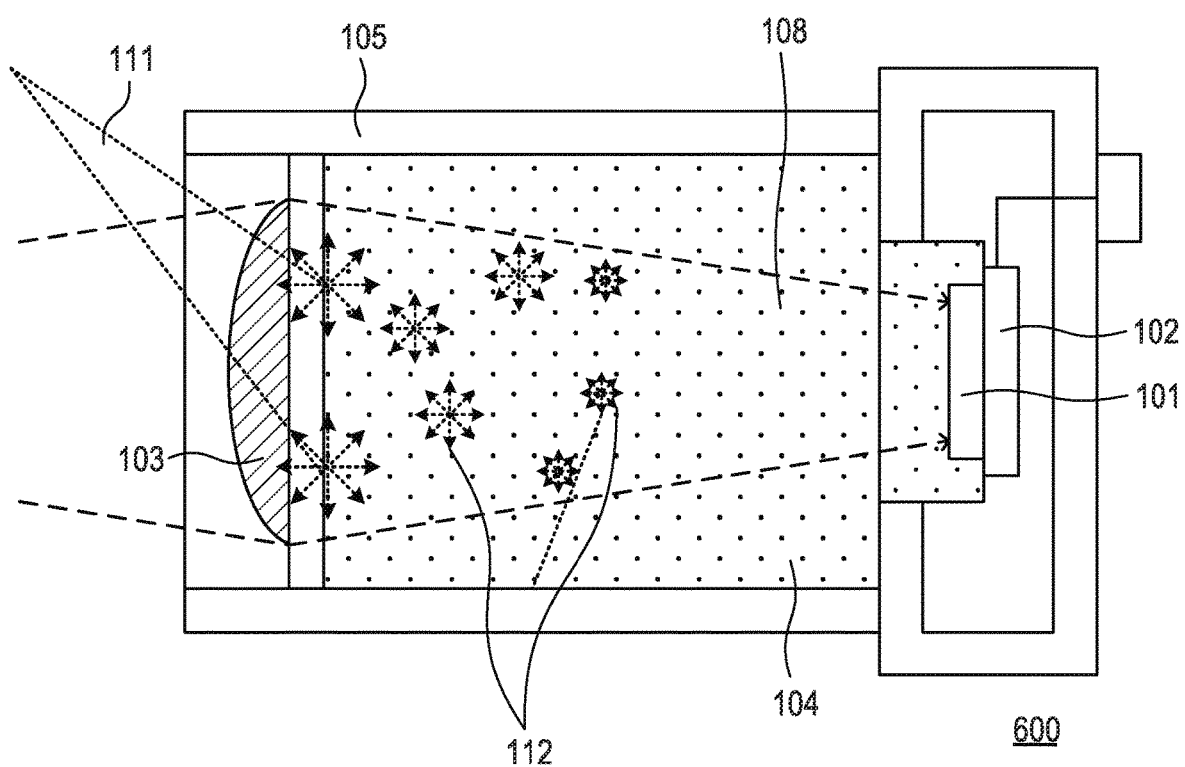
FIG. 6 is a diagram illustrating a configuration of a terahertz wave camera of a fourth embodiment.

A fourth embodiment of the present invention will be described with reference to the drawings. The present embodiment is a modified example of the second light-shielding portion 104. Configurations different from the embodiments described above will be mainly described, and description of the common part will be omitted or simplified. FIG. 6 is a diagram illustrating the configuration of a terahertz wave camera 600 of the present embodiment. A difference from the configuration of the terahertz wave camera 100 or 500 of the embodiment described above is in the arrangement of the second light-shielding portion 104. The second light-shielding portion 104 is arranged in contact with at least the first light-shielding portion 103 (or the support portion of the first light-shielding portion) and the exposed circuit portion of the readout circuit unit 102. Further, the second light-shielding portion 104 is filled between the first light-shielding portion 103 and the readout circuit unit 102. That is, the second light-shielding portion 104 is filled in a space surrounded by the first light-shielding portion 103, the camera casing 105, and the readout circuit unit 102.

As described in the second embodiment, it is desirable that the second light-shielding portion 104 have a scattering structure so as not to deteriorate the image capturing characteristic to the terahertz wave 108 of the first light-shielding portion 103. For example, when the air hole part 214 described in the first embodiment is applied as the scattering structure, the average refractive index to the terahertz wave 108 of the second light-shielding portion 104 becomes closer to the refractive index of the atmosphere. Thus, deterioration of an image capturing characteristic of the first light-shielding portion 103 due to the second light-shielding portion 104 can be suppressed.

According to such a configuration, since the space interposed between the first light-shielding portion 103 and the readout circuit unit 102 is filled with the second light-shielding portion 104, the light-shielding region to the disturbance light 111 increases. Thus, since the light amount of the disturbance light 111 reaching the readout circuit unit 102 decreases, noise of the terahertz wave camera 600 is further reduced, and the SN ratio of the terahertz wave camera 600 is improved.

Fifth Embodiment

A fifth embodiment of the present invention will be described with reference to the drawings. The present embodiment is a modified example of the second light-shielding portion 104. Configurations different from the embodiment described above will be mainly described, and description of the common part will be simplified or omitted.

The terahertz wave 108 attenuates due to water vapor contained in the atmosphere, and the signal intensity thereof decreases. Accordingly, in the present embodiment, at least a part of the circumference or the surface of the second light-shielding portion 104 is sealed by a member transparent to the terahertz wave 108, and the internal air hole part 214 sealed by the transparent member is replaced with a drying gas. The transparent member may be, for example, a film (a polyolefin film or a polyethylene film) that exhibits a low loss to the terahertz wave 108. In detail, the transparent member is formed in contact with at least a portion where a propagation path along which the terahertz wave 108 reaches the sensor unit 101 intersects the boundary of the outermost portion of the second light-shielding portion 104, and a drying gas is enclosed. The boundary of a portion not intersecting the propagation path of the terahertz wave 108 may be replaced with a non-transparent member. In the configuration of FIG. 6, the transparent member may be provided at least at the boundary between the first light-shielding portion 103 and the second light-shielding portion 104 or the boundary between the sensor unit 101 and the second light-shielding portion 104. In the configuration of FIG. 1A, the transparent member may be provided at the boundary between an air layer inside the camera casing 105 and the second light-shielding portion 104.

According to the present embodiment, the propagation path of the terahertz wave 108 inside the terahertz wave camera 600 is filled with a drying gas, and attenuation of the terahertz wave 108 due to the atmosphere can be suppressed.

Thus, since the light amount of the disturbance light 111 reaching the readout circuit unit 102 decreases and attenuation of the terahertz wave 108 is suppressed, each SN ratio of the terahertz wave cameras 100 and 600 is improved.

Sixth Embodiment

A sixth embodiment of the present invention will be described with reference to the drawings. The present embodiment is a modified example of the second light-shielding portion 104. Configurations different from the embodiment described above will be mainly described, and description of the common part will be omitted or simplified. The present embodiment can be regarded as a detection module used for a terahertz wave camera that detects a terahertz wave from a measurement target and acquires information on the measurement target.

Figure 13:
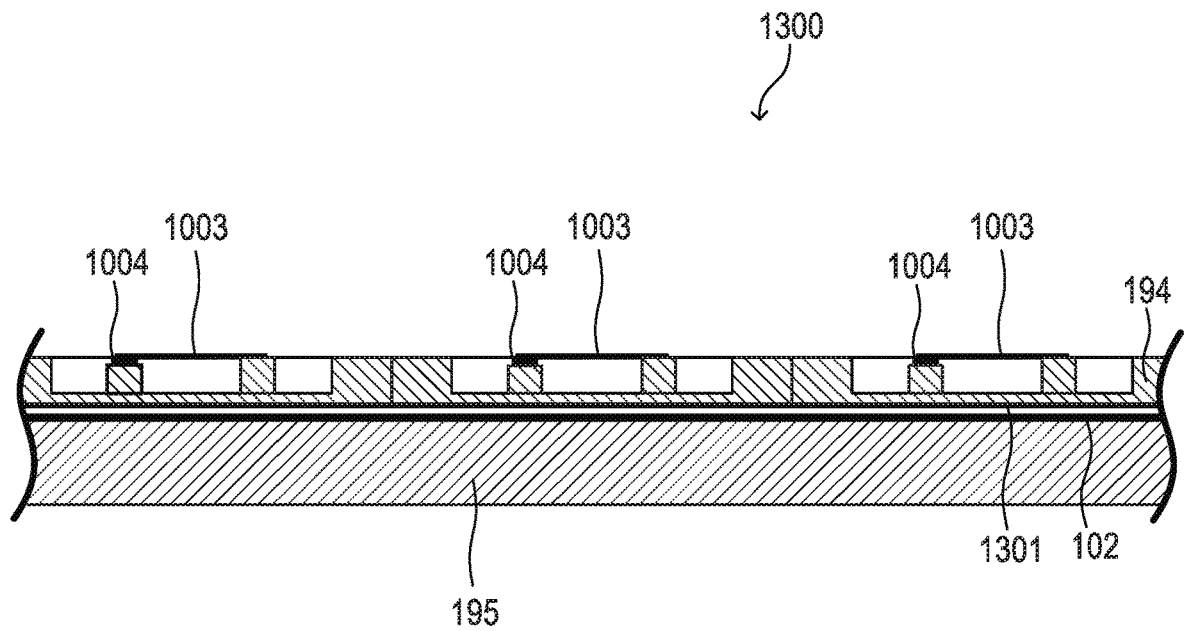
FIG. 13 is a sectional view of a part of the detection module of the sixth embodiment.

FIG. 13 is a sectional view of a part of the detection module in the present embodiment. In FIG. 13, a detection module 1300 has elements arranged in a matrix as described in FIG. 10A to FIG. 10C. Each of these elements has at least the detection element 1004 that has spectral sensitivity to a terahertz wave and detects the terahertz wave and the antenna 1003 used for receiving a terahertz wave. These elements are formed on the sensor substrate 194. That is, the readout circuit unit 102 is formed on the readout circuit substrate 195, and the sensor substrate 194 is provided on the readout circuit unit 102 via a first light-shielding portion 1301. That is, the sensor substrate 194 and the readout circuit substrate 195 are joined so as to face each other and interpose the readout circuit unit 102. The first light-shielding portion 1301 that reflects disturbance light is formed on the underside of the sensor substrate 194 in the same manner as the element configuration of FIG. 10A to FIG. 10C. The first light-shielding portion 1301 is arranged in a different level from the detection element 1004.

The first light-shielding portion 1301 is formed of a metal layer, for example, and concentrates a terahertz wave above the sensor substrate 194. The metal layer reflects external incident disturbance light and prevents the disturbance light from reaching the readout circuit unit 102 provided below the sensor substrate 194. In such a way, the metal layer functions as a light-shielding portion. The first light-shielding portion 1301 is not limited to a metal layer but may be formed of a dielectric multilayer film.

Figure 8A:
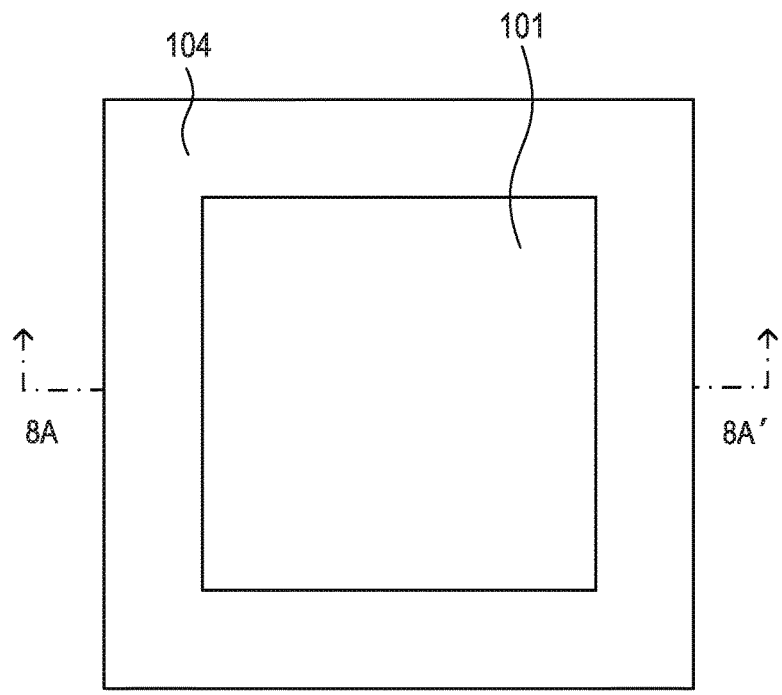
FIG. 8A is a plan view of an arrangement example of a detection module of a sixth embodiment.
Figure 8B:
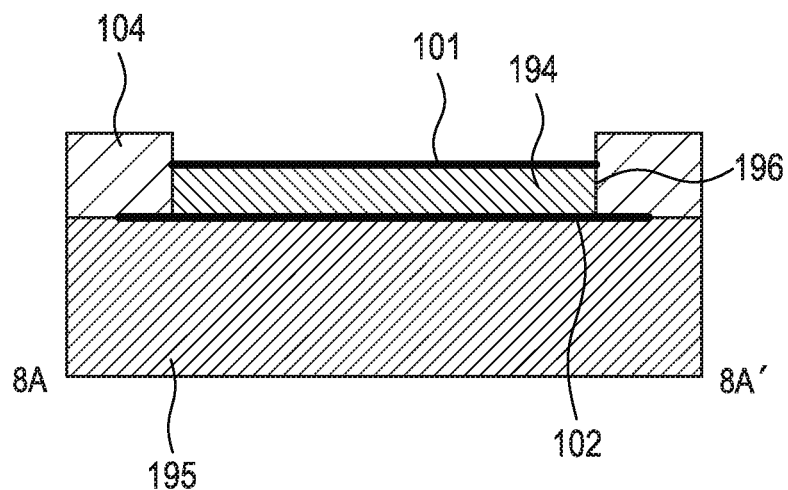
FIG. 8B is a sectional view of an arrangement example of the detection module of the sixth embodiment.

Various modified examples of the detection module in the present embodiment will be described below. FIG. 8A and FIG. 8B illustrate a plan view and a sectional view taken along a dashed line 8A-8A' of a detection module as a modified example of the present embodiment. A difference from the arrangement of the second light-shielding portion 104 in the embodiments described above is that the second light-shielding portion 104 is arranged in at least an exposed circuit portion of the readout circuit unit 102 and is not arranged on the surface of the sensor unit 101 that detects the terahertz wave 108.

In FIG. 8A and FIG. 8B, the sensor substrate 194 having the sensor unit 101 and the readout circuit substrate 195 having the readout circuit unit 102 are attached to each other. The external shape of the sensor substrate 194 is smaller than the external shape of the readout circuit substrate 195, and the readout circuit substrate 195 around the sensor substrate 194 is exposed in plan view. The second light-shielding portion 104 is arranged to cover the exposed circuit portion of the readout circuit unit 102 along the outer circumference of the sensor unit 101. The second light-shielding portion 104 is preferably arranged in contact with the side wall portion 196 of the sensor unit 101 so as to cover the exposed circuit portion of the readout circuit unit 102. Herein, the exposed circuit portion is a portion which is not covered with the sensor substrate 194 out of the readout circuit unit 102. Further, in sectional view, the second light-shielding portion 104 is thicker (higher) than the sensor substrate 194. It is therefore possible to shield the sensor substrate 194 from diagonal disturbance light.

Figure 11A:
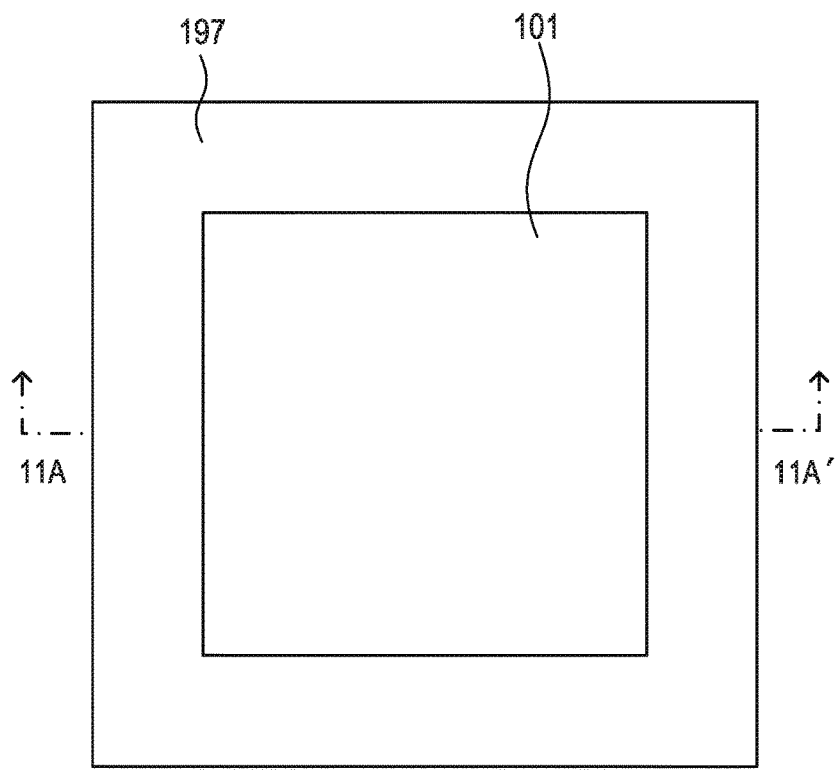
FIG. 11A is a plan view of a configuration example of the detection module of the sixth embodiment.
Figure 11B:
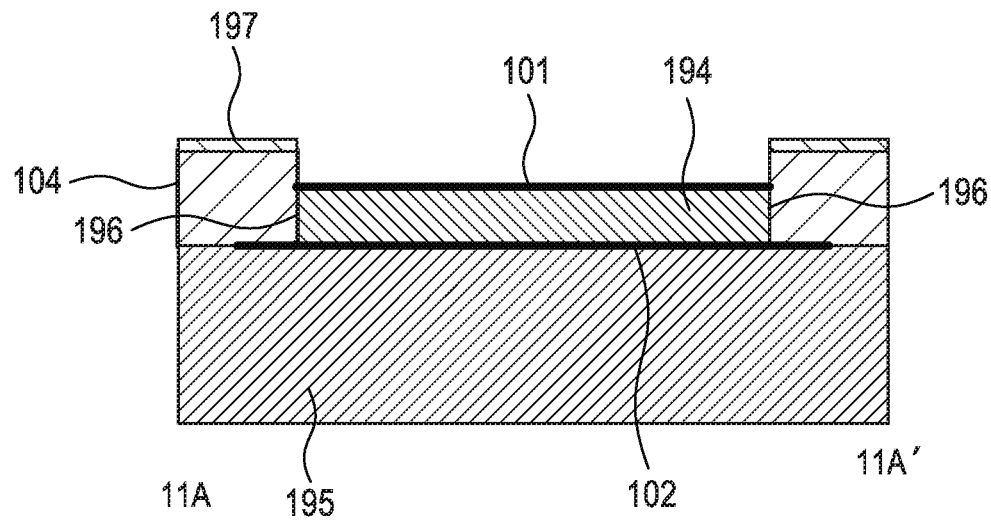
FIG. 11B is a sectional view of a configuration example of the detection module of the sixth embodiment.

FIG. 11A and FIG. 11B illustrate a plan view and a sectional view taken along a dashed line 11A-11A' of a detection module as a modified example. As illustrated in FIG. 11B, the reflective portion 197 that reflects disturbance light is formed on the top face of the second light-shielding portion 104. The reflective portion 197 may be formed using a metal layer or a dielectric multilayer film layer that reflects disturbance light. Further, when the reflective portion 197 is formed of a metal layer, the metal layer may also function as a heatsink that dissipates heat generated by the readout circuit unit 102. With such a configuration, it is possible to reduce disturbance light reaching the exposed circuit portion of the readout circuit unit 102.

Figure 12A:
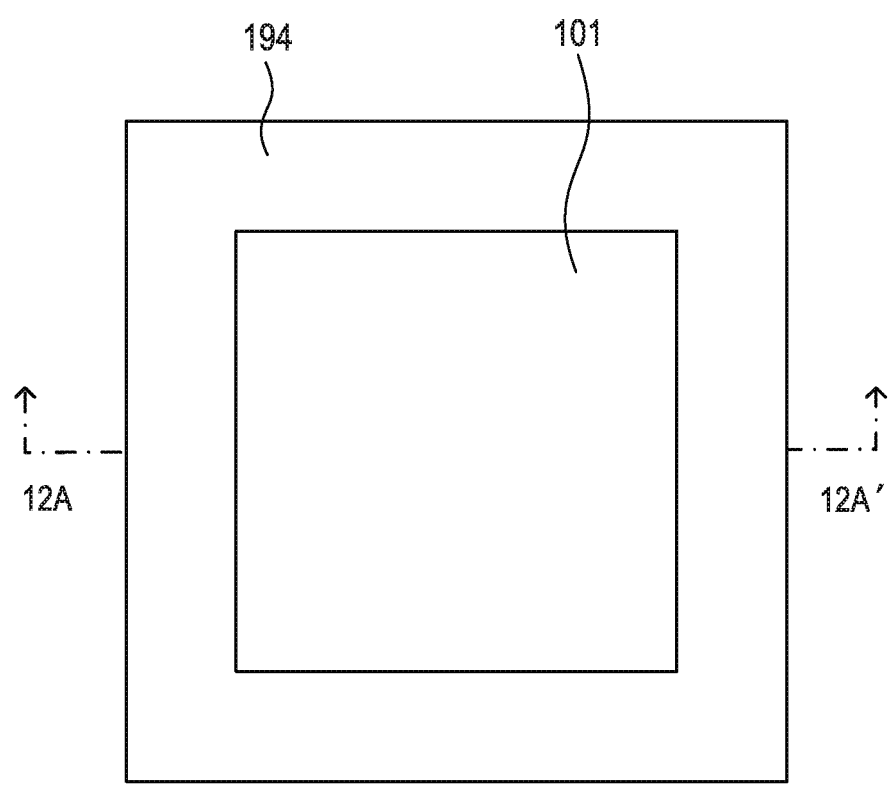
FIG. 12A is a plan view of an arrangement example of the detection module of the sixth embodiment.
Figure 12B:
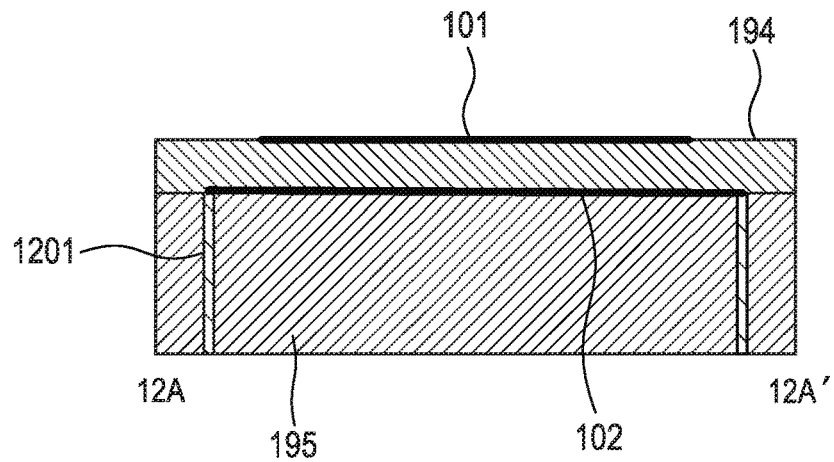
FIG. 12B is a sectional view of an arrangement example of the detection module of the sixth embodiment.
Figure 12C:
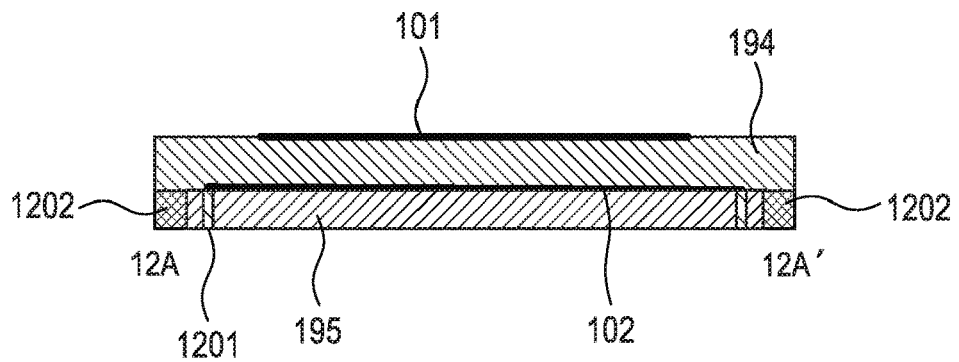
FIG. 12C is a sectional view of an arrangement example of the detection module of the sixth embodiment.

FIG. 12A, FIG. 12B, and FIG. 12C illustrate a plan view and sectional views taken along a dashed line 12A-12A' of a detection module as yet another modified example. The disturbance light reaching the center part of the readout circuit unit 102 is blocked to some degrees by the sensor unit 101 and the sensor substrate 194. Thus, the sensor unit 101 and the sensor substrate 194 may serve as the second light-shielding portion. For example, in the detection module of FIG. 12A and FIG. 12B, the external shape of the readout circuit substrate 195 is substantially the same as the external shape of the sensor substrate 194. With the external shape of the readout circuit substrate 195 being substantially the same as that of the sensor substrate 194, the whole readout circuit unit 102 arranged in the readout circuit substrate 195 can be reliably covered with the sensor substrate 194. In other words, the exposed circuit portion of the readout circuit unit 102 can be reliably eliminated. Thus, disturbance light that would otherwise reach the readout circuit unit 102 is blocked by the sensor unit 101 or the sensor substrate 194.

In FIG. 12A to FIG. 12C, the whole top face of the readout circuit unit 102 is covered with the sensor substrate 194, and the readout circuit unit 102 is not exposed. It is therefore desirable that the readout circuit unit 102 and an external circuit be connected by a through electrode 1201 penetrating through the readout circuit substrate 195.

FIG. 12C illustrates a sectional view of a detection module that is a modified example of the detection module illustrated in FIG. 12A and FIG. 12B. A difference from the configuration of FIG. 12B will be mainly described below. The external shape of the readout circuit substrate 195 is smaller than the external shape of the sensor substrate 194 in plan view. That is, the readout circuit substrate 195 does not protrude from the sensor substrate 194 in plan view. Further, compared to the detection module of FIG. 12B, the readout circuit substrate 195 is formed thinner. When the thickness of the readout circuit substrate 195 is thinner than that of the sensor substrate 194, if the peripheral edge of the sensor substrate 194 protrudes in the horizontal direction, the readout circuit substrate 195 would be damaged due to external force applied to the peripheral edge. To prevent the damage, a substrate support portion 1202 is provided to the peripheral edge of the sensor substrate 194, the peripheral edge of the sensor substrate 194 is supported by the substrate support portion 1202.

In the configuration illustrated in FIG. 12A, FIG. 12B, and FIG. 12C, since the readout circuit unit 102 is covered with the sensor substrate 194, disturbance light to the readout circuit unit 102 is reduced by the sensor unit 101 or the sensor substrate 194. Further, since the second light-shielding portion 104 can be omitted, this facilitates a reduction in size of the device while suppressing influence of disturbance light. Furthermore, the external shape of the readout circuit substrate 195 is the same as or smaller than the external shape of the sensor substrate 194, and thereby the disturbance light reaching the readout circuit unit 102 on the readout circuit substrate 195 can be reliably reduced. Thus, since influence of noise due to unnecessary charges caused by disturbance light is suppressed in the readout circuit unit 102, the SN ratio of the terahertz wave camera 100 is improved.

Figure 9A:
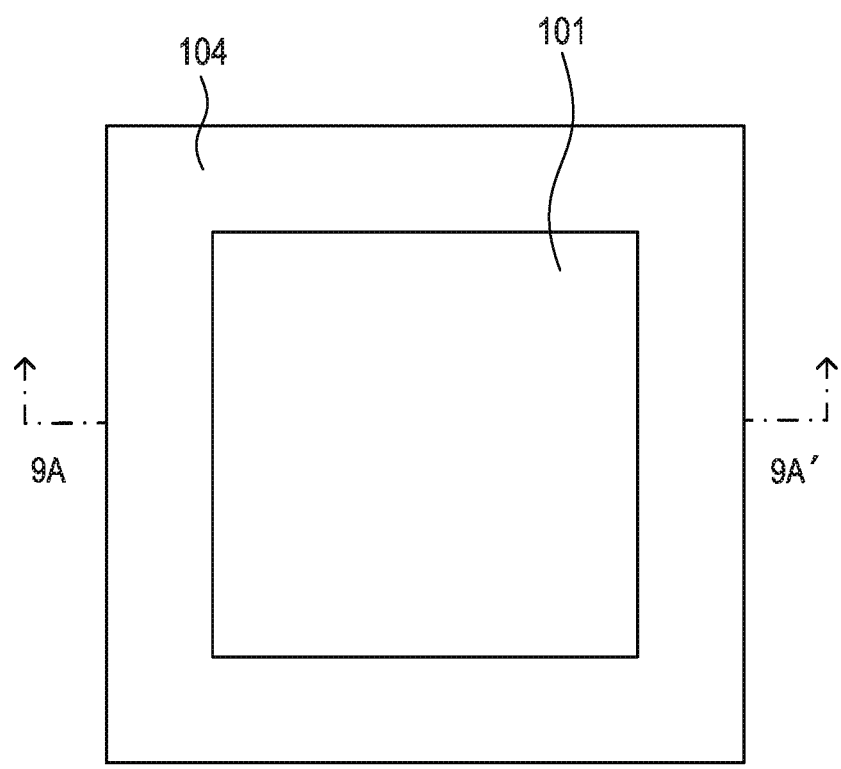
FIG. 9A is a plan view of another arrangement example of the detection module of the sixth embodiment.
Figure 9B:
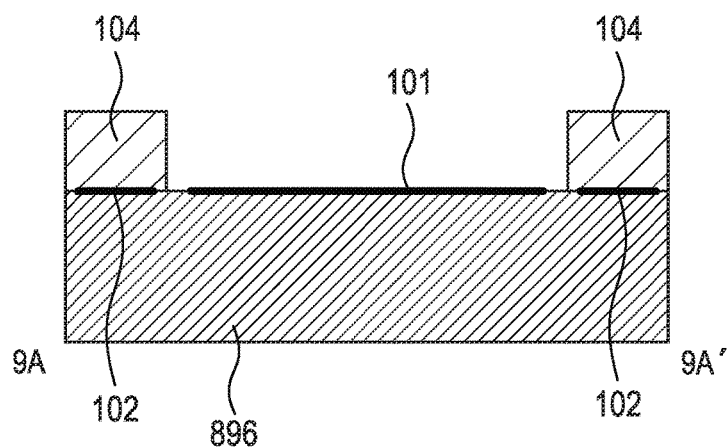
FIG. 9B is a sectional view of another arrangement example of the detection module of the sixth embodiment.

FIG. 9A and FIG. 9B illustrate a plan view and a sectional view taken along a dashed line 9A-9A' of a modified example of the detection module illustrated in FIG. 8A and FIG. 8B. The sensor unit 101 and the readout circuit unit 102 are formed integrally with the common module substrate 896. The second light-shielding portion 104 is arranged so as to cover the readout circuit unit 102 along the outer circumference of the sensor unit 101. In this example, the exposed circuit portion is the readout circuit unit 102. In the present embodiment, the second light-shielding portion 104 is arranged in the whole outer circumference of the sensor unit 101 but may be arranged in a part thereof. For example, the second light-shielding portion 104 may be arranged selectively only in a portion where the readout circuit unit 102 is exposed to the outside.

According to the configuration of the present embodiment, since the second light-shielding portion 104 is arranged integrally with an exposed circuit portion of the readout circuit unit 102, a holding mechanism of the second light-shielding portion 104 can be eliminated. This enables a reduction in the size of the terahertz wave camera 100.

Further, the detection module of the present embodiment can reduce disturbance light reaching the readout circuit unit by using the sensor substrate having the first light-shielding portion or otherwise the sensor substrate and the second light-shielding portion. Thus, since influence of noise due to unnecessary charges caused by disturbance light is suppressed in the readout circuit unit, the SN ratio of the detection module is improved. In particular, with the external shape of the readout circuit substrate being the same as or smaller than the external shape of the sensor substrate, the exposed portion of the readout circuit unit can be eliminated, and therefore the disturbance light reaching the readout circuit unit on the readout circuit substrate can be reliably reduced. Further, since the present detection module is configured to be less likely to be affected by disturbance light, a casing used for light-shielding can be simplified. Furthermore, because of the configuration that is less likely to be affected by disturbance light, there is flexibility in installation of the detection module within the device, and this allows for easier handling of the detection module.

The present invention is not limited to the embodiments described above, and various changes and modifications are possible without departing from the spirit and the scope of the present invention. Therefore, the following claims are attached in order to make the scope of the present invention public.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A terahertz wave camera that detects a terahertz wave from a measurement target and acquires information on the measurement target, the terahertz wave camera comprising:
a sensor in which a plurality of detection elements having spectral sensitivity to the terahertz wave are arranged, each including an antenna;
a readout circuit configured to read out signals from the plurality of detection elements;
a first light-shielding portion configured to (a) reduce disturbance light to which the readout circuit has spectral sensitivity and (b) serve as an optical element having an optical power configured to guide a terahertz wave from the measurement target to the sensor, and
a second light-shielding portion configured to (a) reduce the disturbance light that is reduced by the first light-shielding portion and (b) transmit the terahertz wave, the second light-shielding portion being arranged between the first light-shielding portion and the sensor,
wherein in a cross-section view, the first light-shielding portion and the second light-shielding portion are arranged crossing an optical axis of the terahertz wave camera.

2. The terahertz wave camera according to claim 1, wherein the second light-shielding portion is arranged inclined with respect to the optical axis.

3. The terahertz wave camera according to claim 1, wherein at least one of the first light-shielding portion and the second light-shielding portion has structure to scatter the disturbance light.

4. The terahertz wave camera according to claim 3, wherein the structure to scatter the disturbance light comprises air hole parts formed in the at least one of the first light-shielding portion and the second light-shielding portion, and
wherein a size of each of the air hole parts is smaller than or equal to $\frac{1}{10} \times \lambda 1$ with respect to a wavelength $\lambda 1$ of the terahertz wave and larger than or equal to $\lambda 2$ with respect to the wavelength $\lambda 2$ of the disturbance light.

5. The terahertz wave camera according to claim 3, wherein the structure to scatter the disturbance light comprises air hole parts formed in the at least one of the light-shielding portions, and
wherein a distance between the adjacent air hole parts is smaller than or equal to $\frac{1}{10} \times \lambda 1$ with respect to a wavelength $\lambda 1$ of the terahertz wave and larger than or equal to $\lambda 2$ with respect to the wavelength $\lambda 2$ of the disturbance light.

6. The terahertz wave camera according to claim 3, wherein an unevenness portion is formed in a part of at least one of the first light-shielding portion and the second light-shielding portion.

7. The terahertz wave camera according to claim 6, wherein the unevenness portion has a depth and a width that are smaller than or equal to $\frac{1}{10} \times \lambda 1$ with respect to a wavelength $\lambda 1$ of the terahertz wave and larger than or equal to $\lambda 2$ with respect to the wavelength $\lambda 2$ of the disturbance light.

8. The terahertz wave camera according to claim 1, wherein the first light-shielding portion and the second light-shielding portion are integrally formed.

9. The terahertz wave camera according to claim 1, further comprising:
a casing; and a third light-shielding portion that is provided on an inner wall of the casing and reduces the disturbance light.

10. The terahertz wave camera according to claim 1, wherein the second light-shielding portion is arranged in at least an exposed circuit portion of the readout circuit.

11. The terahertz wave camera according to claim 1, wherein the second light-shielding portion is arranged in contact with at least the first light-shielding portion and an exposed circuit portion of the readout circuit.

12. The terahertz wave camera according to claim 11, wherein air hole parts that scatter the disturbance light are formed in the second light-shielding portion, and
wherein at least a part of a surface of the second light-shielding portion is sealed by a member transparent to the terahertz wave, and
wherein the air hole parts of an inside sealed by the member are replaced with a drying gas.

13. The terahertz wave camera according to claim 1, wherein the readout circuit is arranged near the sensor.

14. The terahertz wave camera according to claim 1, wherein the sensor and the readout circuit are integrally arranged.

15. The terahertz wave camera according to claim 14, wherein the sensor and the readout circuit are arranged on a common substrate.

16. The terahertz wave camera according to claim 1, wherein the terahertz wave is detected to make an image of the measurement target.

17. The terahertz wave camera according to claim 1, wherein the plurality of detection elements are arranged in a matrix in the sensor.

18. The terahertz wave camera according to claim 1, wherein the terahertz wave is a radio wave in any frequency band of a range from 0.2 THz to 30 THz.

19. The terahertz wave camera according to claim 1, wherein the disturbance light is visible light and infrared light.

20. The terahertz wave camera according to claim 1, wherein the sensor, the optical element, the first light-shielding portion, and the second light-shielding portion are arranged in a casing.

21. The terahertz wave camera according to claim 1, further comprising a terahertz wave source.

22. The terahertz wave camera according to claim 1, wherein the sensor is arranged on a first substrate,
wherein the readout circuit is arranged on a second substrate, and
wherein the first substrate and the second substrate are stacked on each other.

23. A detection module used for a terahertz wave camera that detects a terahertz wave from a measurement target and acquires information on the measurement target, the detection module comprising:
a sensor substrate;
a plurality of detection elements provided on a first primary face of the sensor substrate and having spectral sensitivity to the terahertz wave;
a first light-shielding portion configured to reduce disturbance light other than the terahertz wave, the first light-shielding portion being arranged in a different level from the plurality of detection elements in a sectional view of the sensor substrate;
a second light-shielding portion configured to (a) reduce the disturbance light reduced by the first light-shielding portion and (b) transmit the terahertz wave;
a readout circuit substrate provided so as to face a second primary face of the sensor substrate; and
a readout circuit that is provided on the readout circuit substrate, the readout circuit having spectral sensitivity to the disturbance light, and the readout circuit being configured to read out signals from the plurality of detection elements,
wherein the second light shielding portion is provided on an area of the readout circuit which extends beyond the sensor substrate in a plan view, and
wherein the second light-shielding portion is thicker than the sensor substrate in a sectional view.

24. The detection module used for a terahertz wave camera according to claim 23, wherein the second light-shielding portion is (a) in contact with an exposed circuit portion that is not covered with the sensor substrate and a side wall of the sensor substrate on a primary face on the sensor substrate side of the two primary faces of the readout circuit substrate and (b) reduces the disturbance light.

25. The detection module used for a terahertz wave camera according to claim 23, wherein the readout circuit is covered with the sensor substrate and does not protrude from the sensor substrate in a plan view.

26. The detection module used for a terahertz wave camera according to claim 25, further comprising a substrate support portion that supports a peripheral edge protruding from the readout circuit in a plan view of the sensor substrate.

27. The detection module used for a terahertz wave camera according to claim 23, wherein the first light-shielding portion and the second light-shielding portion include a metal layer or a dielectric multilayer film.

28. The detection module used for a terahertz wave camera according to claim 23, wherein the sensor, the optical element, the first light-shielding portion, and the second light-shielding portion are arranged in a casing.

29. The detection module used for a terahertz wave camera according to claim 23, wherein the sensor substrate and the readout circuit substrate are stacked on each other.

30. A terahertz wave camera that detects a terahertz wave from a measurement target and that acquires information on the measurement target, the terahertz wave camera comprising:
a sensor in which a plurality of detection elements having spectral sensitivity to the terahertz wave are arranged;
a readout circuit configured to read out signals from the plurality of detection elements;
a first light-shielding portion configured to reduce disturbance light to which the readout circuit has spectral sensitivity;
an optical element configured to guide a terahertz wave from the measurement target to the sensor, and
a second light-shielding portion configured to (a) reduce the disturbance light that is reduced by the first light-shielding portion and (b) transmit the terahertz wave, the second light-shielding portion being (i) arranged between the first light-shielding portion and the sensor and (ii) arranged between the optical element and the sensor,
wherein the sensor includes an antenna and a third light-shielding portion, with the antenna being arranged between the second light-shielding portion and the third light-shielding portion.

31. The terahertz wave camera according to claim 30, wherein the sensor is arranged on a first substrate,
wherein the readout circuit is arranged on a second substrate, and
wherein the first substrate and the second substrate are stacked on each other.

32. A terahertz wave camera comprising:
a sensor in which a plurality of detection elements having spectral sensitivity to the terahertz wave are arranged;
a readout circuit configured to read out signals from the plurality of detection elements;
a first scattering portion configured to scatter disturbance light to which the readout circuit has spectral sensitivity;
a second scattering portion configured to scatter the disturbance light, the second light-shielding portion being arranged between the first scattering portion and the sensor,
wherein the first scattering portion and the second light-shielding portion are arranged crossing an optical axis of the terahertz wave camera.

33. The terahertz wave camera according to claim 32, wherein the sensor is arranged on a first substrate,
wherein the readout circuit is arranged on a second substrate, and
wherein the first substrate and the second substrate are stacked on each other.

34. The terahertz wave camera according to claim 32, wherein an unevenness portion is formed in at least one of the first scattering portion and the second scattering portion.

35. The terahertz wave camera according to claim 32, wherein air hole parts are formed in at least one of the first scattering portion and the second scattering portion.

36. The terahertz wave camera according to claim 32, wherein each of the plurality of detection elements includes an antenna.

37. The terahertz wave camera according to claim 32, wherein the sensor, the first scattering portion, and the second scattering portion are arranged in a casing.

38. The terahertz wave camera according to claim 32, wherein the first scattering portion serves as an optical element having an optical power configured to guide a terahertz wave to the sensor.

* * * * *